United States Patent
Wolff et al.

(10) Patent No.: US 6,912,608 B2
(45) Date of Patent: Jun. 28, 2005

(54) METHODS AND APPARATUS FOR PIPELINED BUS

(75) Inventors: Edward A. Wolff, Chapel Hill, NC (US); David Baker, Austin, TX (US); Bryan Garnett Cope, Durham, NC (US); Edwin Franklin Barry, Vilas, NC (US)

(73) Assignee: PTS Corporation, San Jose, CA (US)

(*) Notice: Subject to any disclaimer, the term of this patent is extended or adjusted under 35 U.S.C. 154(b) by 386 days.

(21) Appl. No.: 10/131,941

(22) Filed: Apr. 25, 2002

(65) Prior Publication Data

US 2003/0046462 A1 Mar. 6, 2003

Related U.S. Application Data

(60) Provisional application No. 60/287,270, filed on Apr. 27, 2001.

(51) Int. Cl.$^7$ .................................................. G06F 13/00
(52) U.S. Cl. ........................ 710/100; 710/21; 712/10; 712/11; 711/140; 345/506
(58) Field of Search ................ 710/100, 21; 712/10, 712/11; 711/140; 345/506

(56) References Cited

U.S. PATENT DOCUMENTS

| | | | | |
|---|---|---|---|---|
| 5,165,024 A | * | 11/1992 | Sweazey | 710/100 |
| 5,280,474 A | * | 1/1994 | Nickolls et al. | 370/389 |
| 5,404,353 A | * | 4/1995 | Ben-Michael et al. | 370/235 |
| 5,454,082 A | * | 9/1995 | Walrath et al. | 710/108 |
| 5,598,408 A | * | 1/1997 | Nickolls et al. | 370/351 |
| 5,701,413 A | * | 12/1997 | Zulian et al. | 709/214 |
| 5,857,087 A | * | 1/1999 | Bemanian et al. | 710/305 |
| 5,870,540 A | * | 2/1999 | Wang et al. | 714/43 |
| 6,105,122 A | * | 8/2000 | Muller et al. | 712/1 |
| 6,108,752 A | * | 8/2000 | VanDoren et al. | 711/117 |
| 6,230,252 B1 | * | 5/2001 | Passint et al. | 712/12 |
| 6,256,719 B1 | * | 7/2001 | Frankel | 712/11 |
| 6,269,360 B1 | * | 7/2001 | Petersen et al. | 707/2 |
| 6,567,909 B2 | * | 5/2003 | Tsuruta et al. | 712/15 |
| 6,633,936 B1 | * | 10/2003 | Keller et al. | 710/107 |
| 6,654,845 B1 | * | 11/2003 | Morris et al. | 710/305 |
| 6,691,191 B1 | * | 2/2004 | Kobayashi et al. | 710/107 |
| 6,721,878 B1 | * | 4/2004 | Paul et al. | 712/244 |
| 2002/0051445 A1 | * | 5/2002 | Drottar et al. | 370/362 |
| 2002/0059442 A1 | * | 5/2002 | Van Loo | 709/232 |

OTHER PUBLICATIONS

Kaneko, H., et al., "A 32–Bit CMOS Microprocessor with Six–Stage Pipeline Structure," 1986, Proceedings of 1986 ACM Fall Joint Computer Conference, IEEE Computer Society Press, Proceedings, p. 1000–1007.*

Ramamoorthy, C.V., et al., "Pipeline Architecture," 1977, ACM Press, vol. 9, Issue 1, p. 61–102.*

* cited by examiner

Primary Examiner—Mark H. Rinehart
Assistant Examiner—Donna K. Mason
(74) Attorney, Agent, or Firm—Priest & Goldstein

(57) ABSTRACT

Techniques for a pipelined bus which provides a very high performance interface to computing elements, such as processing elements, host interfaces, memory controllers, and other application-specific coprocessors and external interface units. The pipelined bus is a robust interconnected bus employing a scalable, pipelined, multi-client topology, with a fully synchronous, packet-switched, split-transaction data transfer model. Multiple non-interfering transfers may occur concurrently since there is no single point of contention on the bus. An aggressive packet transfer model with local conflict resolution in each client and packet-level retries allows recovery from collisions and buffer backups. Clients are assigned unique IDs, based upon a mapping from the system address space allowing identification needed for quick routing of packets among clients.

21 Claims, 21 Drawing Sheets

FIG. 6
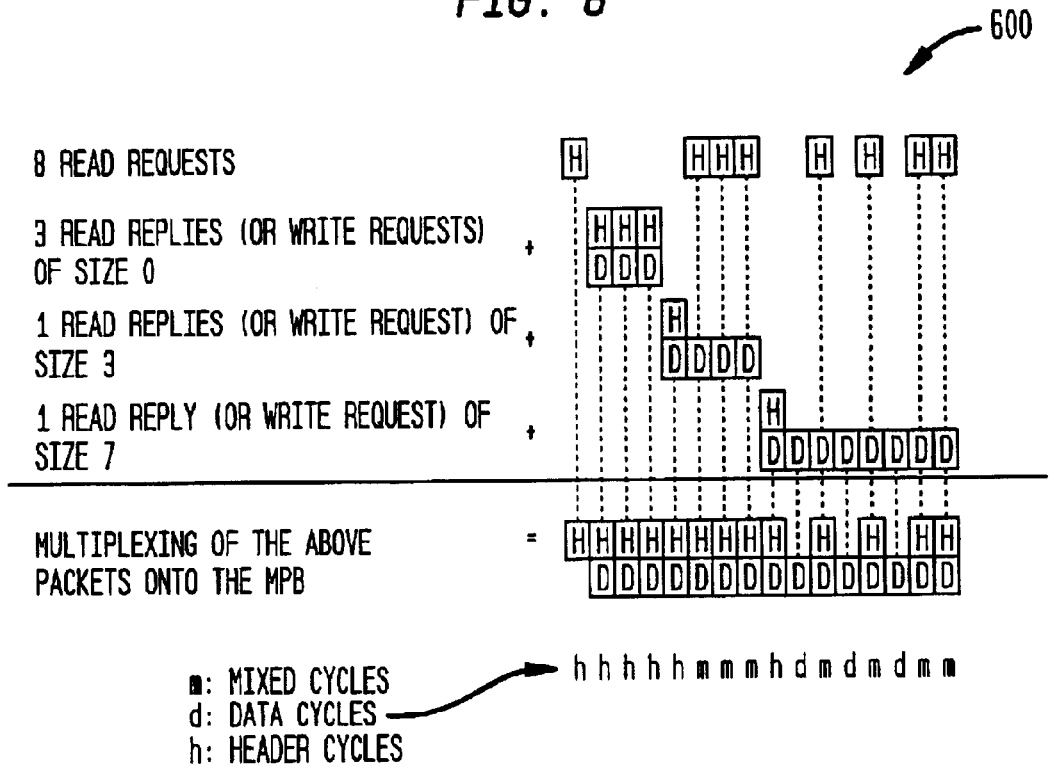
a: MIXED CYCLES
d: DATA CYCLES
h: HEADER CYCLES
FIG. 7A
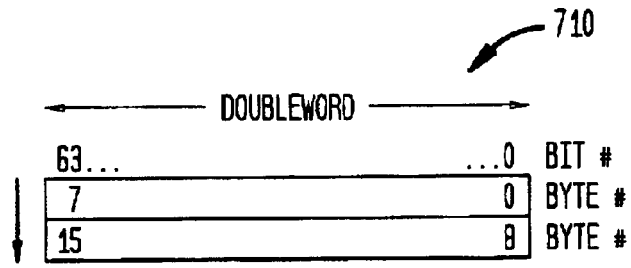
FIG. 7B

FIG. 7C
                                                                    720

DENA            This signal is asserted by the sending client and signifies a valid
                data or mixed cycle. It qualifies the DATA and WEN signals.
                When not issuing a packet of its own, the client simply passes the
                upstream DENA.

DATA    (63:0)  These 64 signals designate 8 bytes of data being transfered each
                cycle.

WEN     (7:0)   This field of 8 signals specifies which corresponding DATA bytes
                are to be enabled for writing at the destination. When any WEN bit
                is asserted (1), the corresponding DATA byte is written. WEN (0)
                corresponds to DATA (7:0) bits; while WEN (7) corresponds to
                DATA (63:56) bits

| | | |
|---|---|---|
| HENA | | This signal is asserted by the sending client and signifies a valid header or mixed cycle. It qualifies all header signals. When not issuing a packet of its own, the client simply passes the upstream HENA. |
| SADR | (31:0) | These 32 signals designate the starting byte address of the data at the destination. They are driven during a header or mixed cycle. Subsequent addresses for each data cycle are determined by incrementing by the bus width size dependent on command (CMND). While the data itself must be self-aligned on bus width-sized boundaries (as if the lower 3 byte address bit were all zero), the lower 3 address bit (SADR[2:0]) may in fact be non-zero. Read reply packet headers are required to return the entire header, and therefore byte resolution address bits may be useful for client data alignment requirements. |
| CMND | (3:0) | These 4 signals designate the type of operation to be performed by this transaction. The LSB is set for reply packets and cleared for request packets. Assignment of the other bits is shown below. |

```
            CMND (0): 1 = Reply        ;0 = Request
            CMND (1): 1 = Write        ;0 = Read
            CMND (2): 1 = CWF          ;0 = inc. from start adr 0000 Read  Request
            0001 Read  Reply
            0010 Write Request
            0011 unused 0100 Read  Request    (CWF)
            0101 Read  Reply      (CWF)
            0110 unused
            0111 unused 1000 Swap  Request
            1001 SWAP  Reply
            1010 unused
            1011 unused 1100 unused
            1101 unused
            1110 Write Broadcast Request
            1111 unused
```

| | | |
|---|---|---|
| SIZE | (4:0) | These 5 signals specify the number of packet cycles - 1 associated with the transaction. For write transactions, it refers to the number of cycles in the request packet, while for read transactions, it refers to the number of cycles in the reply packet. Read request packets have only a header (or mixed) cycle and no data and the SIZE refers to the number of cycles there will be in the reply packet. Packets have sized ranging from 0 for a packet with only a header cycle (with up to 8 bytes of data), to 31 for a packet with a header cycle and 31 data (or mixed) cycles with up to 256 bytes of data. The SIZE and CMND (0) fields are used together to determine the size of the packet. |
| SID | (3:0) | These 4 signals are inserted in the packet header cycle by the sender and identify the sending client. As the header cycle enters the receiving client, these signals are used to form encoded ACK[3:0] signals for SC acknowledgement. For request transactions requiring a reply packet, these signals are retained by the receiving client and used to generate the reply packet header. For request packets, they represent the originator ID, and for reply packets they represent the destination ID. |
| RID | (3:0) | These 4 signals are inserted in the packet header cycle by the sender and identify the receiving client. As the header cycle enters each client, these signals are compared against the client's ID, to determine when the packet has reached the intended receiving client. For request packets, they represent the destination ID, and for reply packets they represent the originator ID. All PB clients are required to monitor all packet headers, and accept those packets destined for them. |
| LOCK | | This signal controls whether a receiving client filters its packet reception. A locking client is a sending client who asserts the LOCK signal in a request packet header. When asserted, the receiving client rejects all subsequent request packets destined for it, from non-locking clients, until it receives an unlock packet from the locking client. |

| | | |
|---|---|---|
| ACK | (3:0) | A receiving (or rejecting) client asserts them with the encoded ID of the sending client, to the RSM. Their assertion is used in conjunction with the REJECT signal, to signify which of the sending client's packet transfers was either completed or rejected. The de-asserted value is all zeroes and an encoded value is asserted for one cycle. |
| | | For each packet transfer, assertion of the completion ACK must occur at the _end_ of the data transfer cycles to avoid orphaning intermediate client rejects while the packet is "on the bus". In other words, during the period between insertion of the packet header and last data cycle at the SC, the SC may reject an upstream packet; and those rejects must not occur later than the PACK for that packet. |
| REJECT | | Asserted by the RC, coincident with its ACK signals, to the RSM to signify whether the sending client's packet transfer was rejected. Otherwise, it has completed. |
| PACK | | The RSM asserts it to the sending client signifying completion of the packet transmission (positive acknowledgement). It's asserted for one cycle. |
| NACK | | The RSM asserts it to the sending client signifying its packet has been rejected. (negative acknowledgement). It's asserted for one cycle. |
| RETRY | | The RSM asserts it to the sending client signifying when the rejected packet may be retried. It's asserted for one cycle. |
| SUSPEND | | The RSM asserts it to the sending client to suspend it from sending its next packet. It's asserted for as many cycles as is needed, to allow fair retry of previously rejected packets. |

| | |
|---|---|
| RESET | All PB clients and RSM are initialized to their non-assertive state with this signal. It is asserted asynchronous to the PBCLK and is de-asserted synchronous to PBCLK. |
| PBCLK | Synchronous clock for all PB clients and RSM. Nominal frequency is 500 MHz. with 50% duty cycle. | e.g. SET WHEN CLIENT 3 IS REJECTED BY CLIENT 4
CLEARED WHEN CLIENT 4 TRANSFER IS COMPLETED e.g. SET WHEN CLIENT 3 IS RETRIED & CLIENT 4 IS SUSPENDED

FIG. 14A

STARTING STATE:  RETRY ARRAY                         SUSPEND ARRAY

CLIENT 1 AND 2 REQUEST SIMULTANEOUSLY.
CLIENT 3 REJECTS CLIENT 2, WHILE CLIENT 2 REJECTS CLIENT 1.

```
              REJECTING CLIENT              SUSPENDED CLIENT
                1  2  3  4                    1  2  3  4
              1 ☐  ■  ☐  ☐                  1 ☐  ☐  ☐  ☐        1402
   REJECTED  2 ☐  ☐  ■  ☐       RETRIED   2 ☐  ☐  ☐  ☐
     CLIENT  3 ☐  ☐  ☐  ☐         CLIENT  3 ☐  ☐  ☐  ☐
              4 ☐  ☐  ☐  ☐                  4 ☐  ☐  ☐  ☐
```

AFTER CLIENT 3 PACKET TRANSFER COMPLETES:

```
              REJECTING CLIENT              SUSPENDED CLIENT
                1  2  3  4                    1  2  3  4
              1 ☐  ■  ☐  ☐                  1 ☐  ☐  ☐  ☐        1404
   REJECTED  2 ☐  ☐  ☐  ☐       RETRIED   2 ☐  ☐  ■  ☐
     CLIENT  3 ☐  ☐  ☐  ☐         CLIENT  3 ☐  ☐  ☐  ☐
              4 ☐  ☐  ☐  ☐                  4 ☐  ☐  ☐  ☐
```

CLIENT 3 IS SUSPENDED UNTIL CLIENT 2 HAS COMPLETED ITS TRANSFER, AS BEFORE.
UPON RETRY, CLIENT 2 PACKET TRANSFER COMPLETES:

```
              REJECTING CLIENT              SUSPENDED CLIENT
                1  2  3  4                    1  2  3  4
              1 ☐  ☐  ☐  ☐                  1 ☐  ■  ☐  ☐        1406
   REJECTED  2 ☐  ☐  ☐  ☐       RETRIED   2 ☐  ☐  ☐  ☐
     CLIENT  3 ☐  ☐  ☐  ☐         CLIENT  3 ☐  ☐  ☐  ☐
              4 ☐  ☐  ☐  ☐                  4 ☐  ☐  ☐  ☐
```

CLIENT 2 IS SUSPENDED UNTIL CLIENT 1 HAS COMPLETED ITS TRANSFER, AS BEFORE.

METHODS AND APPARATUS FOR PIPELINED BUS

The present application claims the benefit of U.S. Provisional Application Ser. No. 60/287,270 filed Apr. 27, 2001, and entitled "Methods and Apparatus for Pipelined Bus" which is incorporated herein by reference in its entirety.

FIELD OF THE INVENTION

The present invention relates generally to improvements in array processing. More specifically, the present invention relates to a pipelined bus architecture which provides a high performance interface to computing elements.

BACKGROUND OF THE INVENTION

As technological improvements allow increasing numbers of processing elements to be placed on a single die, the interconnection requirements for the processing elements continues to increase along with clock rate used by these processing elements. With these higher clock rates and increased loading delays from higher circuit densities, multiple stages may be required to transfer data along the communications bus. Placing stages in a ring topology allows for a very large total bandwidth in a multiprocessing environment by maintaining a small distance between processors.

SUMMARY OF THE INVENTION

The present invention advantageously provides methods and apparatus for a pipelined bus (PB), which provides a very high performance interface to computing elements, such as processing elements, host interfaces, memory controllers, and other application-specific coprocessors and external interface units. The PB is a robust interconnected bus employing a scalable, pipelined, multi-client topology, with a fully synchronous, packet-switched, split-transaction data transfer model. In one embodiment, the PB may have a width of 15 bytes in total, comprised of 9 data bytes and 6 header bytes. While the number of header bytes is unchanged, other data bus widths may be employed based upon application requirements. For example, eight data bytes may be used for data subscriber line (DSL) applications and orthogonal frequency division multiplexing (OFDM), while four data bytes may be used for voice over IP (VOIP) and other low bandwidth applications. A bus width of 16 data bytes, or greater, may be used for high bandwidth applications. Estimated synthesizable bus clock rate for an 8-byte data width is at least 500 MHz, yielding 4 Gbyte/sec peak bandwidth between any two clients, and greater bandwidth where greater client concurrency exists.

Multiple non-interfering transfers may occur concurrently since there is no single point of contention on the bus. This characteristic allows the PB, when used wisely in embedded environments, to attain considerably higher peak bandwidth than prior busses due to the additional concurrency. The availability of this increased concurrency is dependent upon the application I/O dataflow demand and the corresponding positioning of the clients in the pipeline. While this same pipelined nature may increase average bus transfer latency, its negative effect is minimized in systems where the bus clock rate is much greater than the processor clock rate. In systems where processor and bus clock rates are comparable, the bus transfer latency is still of negligible effect when transferring many large packets.

The present invention employs an aggressive packet transfer model with local conflict resolution in each client and packet-level retries to recover from collisions and destination buffer backups. Packet-level retry requires request packet queuing support in each client. The retry principle is to issue a packet transfer once, and if not successful, then remove it from the bus and wait until the blockage is cleared and is controlled by a central retry and suspend module. This optimizes bus availability for other non-conflicting transfers, rather than wasting bus cycles by blindly retrying and cluttering the bus needlessly. Multiple non-interfering transfers may occur concurrently as there is no single point of contention on the bus, allowing higher performance from increased transfer concurrency. In a preferred embodiment, when transferring data to the immediately downstream client, all clients may transfer data concurrently.

Transfers consist of potentially concurrent read request packets and data packets, with data packets varying in length from 1 to 32 cycles. Data packets transfer blocks of contiguously addressable data in either, ascending order from the header starting address, or critical-word-first (CWF) order modulo a power-of-two packet size. To allow for atomic operations, a sender may lock a receiving client. Once locked, only the same sending client can unlock the receiver; all other transfers to that specific receiving client are rejected. Clients are assigned unique IDs, based upon a mapping from the system address space. These IDs allow easy identification needed for quick routing of packets among clients.

Each client may issue as many read transactions as it desires as long as it can process all of the replies, limited only by the depth of the queuing and the ability to resolve unique transactions.

Data signals can be active every cycle during saturating transfer conditions since read requests generate a decoupled, or split transfer, and can be hidden in a mixed cycle during data transfers.

Preemptive flow control is used for retrying packets after collisions, minimizing unnecessary further collisions with the same client and freeing the pipeline for other transfers while the failed transfer is postponed.

A more complete understanding of the present invention, as well as further features and advantages of the invention, will be apparent from the following detailed description and the accompanying drawings.

BRIEF DESCRIPTION OF THE DRAWINGS

FIG. 6 shows a second timing diagram of a packet-switched multi-cycle bus in accordance with the present invention;

FIG. 7A shows a table of the relationship between DENA and HENA signals in accordance with the present invention;

FIG. 7B shows bit and byte numbering conventions in accordance with the present invention;

FIGS. 7C–7G show signal definitions of a pipelined bus in accordance with the present invention;

FIGS. 14A and 14B show a second array sequence in accordance with the present invention;

DETAILED DESCRIPTION

Figure 1:
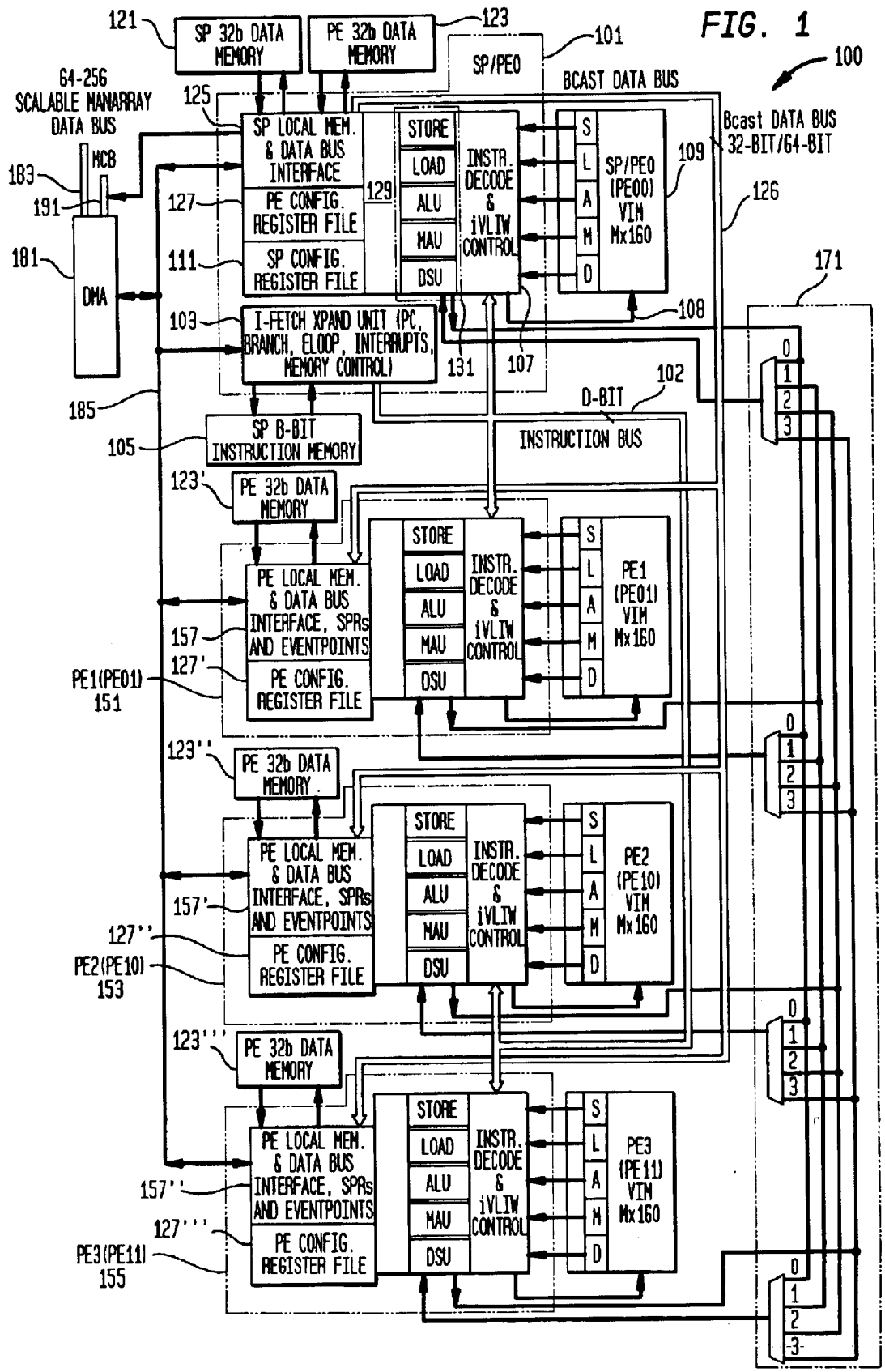
FIG. 1 illustrates an exemplary ManArray DSP and DMA subsystem appropriate for use with this invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of a presently preferred ManArray core, architecture, and instructions for use in conjunction with the present invention are found in: U.S. patent application Ser. No. 08/885,310 filed Jun. 30, 1997, now U.S. Pat. No. 6,023,753; U.S. patent application Ser. No. 08/949,122 filed Oct. 10, 1997, now U.S. Pat. No. 6,167,502; U.S. patent application Ser. No. 09/169,256 filed Oct. 9, 1998, now U.S. Pat. No. 6,167,501; U.S. patent application Ser. No. 09/169,255 filed Oct. 9, 1998, now U.S. Pat. No. 6,343,356; U.S. patent application Ser. No. 09/169,072 filed Oct. 9, 1998, now U.S. Pat. No. 6,219,776; U.S. patent application Ser. No. 09/187,539 filed Nov. 6, 1998, now U.S. Pat. No. 6,151,668; U.S. patent application Ser. No. 09/205,558 filed Dec. 4, 1998, now U.S. Pat. No. 6,173,389; U.S. patent application Ser. No. 09/215,081 filed Dec. 18, 1998, now U.S. Pat. No. 6,101,592; U.S. patent application Ser. No. 09/228,374 filed Jan. 12, 1999, now U.S. Pat. No. 6,216,223; U.S. patent application Ser. No. 09/471,217 filed Dec. 23, 1999, now U.S. Pat. No. 6,260,082; U.S. patent application Ser. No. 09/472,372 filed Dec. 23, 1999, now U.S. Pat. No. 6,256,683; U.S. patent application Ser. No. 09/543,473 filed Apr. 5, 2000, now U.S. Pat. No. 6,321,322; U.S. Pat. application Ser. No. 09/350,191 now U.S. patent No. 6,356,994; U.S. patent application Ser. No. 09/238,446 now U.S. Pat. No. 6,366,999; U.S. patent application Ser. No. 09/267,570 filed Mar. 12, 1999; U.S. patent application Ser. No. 09/337,839 filed Jun. 22, 1999; U.S. patent application Ser. No. 09/422,015 filed Oct. 21, 1999; U.S. patent application Ser. No. 09/432,705 filed Nov. 2, 1999; U.S. patent application Ser. No. 09/596,103 filed Jun. 16, 2000; U.S. patent application Ser. No. 09/598,567 filed Jun. 21, 2000; U.S. patent application Ser. No. 09/598,564 filed Jun. 21, 2000; U.S. patent application Ser. No. 09/598,566 filed Jun. 21, 2000, U.S. patent application Ser. No. 09/598,558 filed Jun. 21, 2000; U.S. patent application Ser. No. 09/598,084 filed Jun. 21, 2000; U.S. patent application Ser. No. 09/599,980 filed Jun. 22, 2000; U.S. patent application Ser. No. 09/711,218 filed Nov. 9, 2000; U.S. patent application Ser. No. 09/747,056 filed Dec. 12, 2000; U.S. patent application Ser. No. 09/853,989 filed May 11, 2001; U.S. patent application Ser. No. 09/886,855 filed Jun. 21, 2001; U.S. patent application Ser. No. 09/791,940 filed Feb. 23, 2001; U.S. patent application Ser. No. 09/792,819 filed Feb. 23, 2001; U.S. patent application Ser. No. 09/792,256 filed Feb. 23, 2001; U.S. patent application Ser. No. 10/013,908 filed Oct. 19, 2001; U.S. application Ser. No. 10/004,010 filed Nov. 1, 2001; U.S. application Ser. No. 10/004,578 filed Dec. 4, 2001; U.S. application Ser. No. 10/116,221 filed Apr. 4, 2002; U.S. application Ser. No. 10/119,660 filed Apr. 10, 2002; Provisional Application Ser. No. 60/287,270 filed Apr. 27, 2001; Provisional Application Ser. No. 60/288,965 filed May 4, 2001; Provisional Application Ser. No. 60/298,624 filed Jun. 15, 2001; Provisional Application Ser. No. 60/298,695 filed Jun. 15, 2001; Provisional Application Ser. No. 60/298,696 filed Jun. 15, 2001; Provisional Application Ser. No. 60/318,745 filed Sep. 11, 2001; Provisional Application Ser. No. 60/340,620 filed Oct. 30, 2001; and Provisional Application Ser. No 60/335,159 filed Nov. 1, 2001; Provisional Application Ser. No. 60/368,509 filed Mar. 29, 2002, all of which are assigned to the assignee of the present invention and incorporated by reference herein in their entirety.

In a presently preferred embodiment of the present invention, a ManArray 2×2 indirect very long instruction word (iVLIW) single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. Pat. Application Ser. No. 09/169,072 entitled "Methods and Apparatus for Dynamically Merging an Array Controller with an Array Processing Element". Three additional PEs 151, 153, and 155 are also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of "short" instruction words (SiW) or abbreviated- instruction words from a B-bit instruction memory 105, where B is determined by the application instruction-abbreviation process to be a reduced number of bits representing ManArray native instructions and/or to contain two or more abbreviated instructions as described in the present invention. If an instruction abbreviation apparatus is not used then B is determined by the SIW format. The fetch controller 103 provides the typical functions needed in a programmable processor, such as a program counter (PC), a branch capability, eventpoint loop operations (see U.S. provisional application Ser. No. 60/1 40,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102.D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function; for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW instruction memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common design PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common design physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", now U.S. Pat. No. 6,023,753, and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

Figure 2:
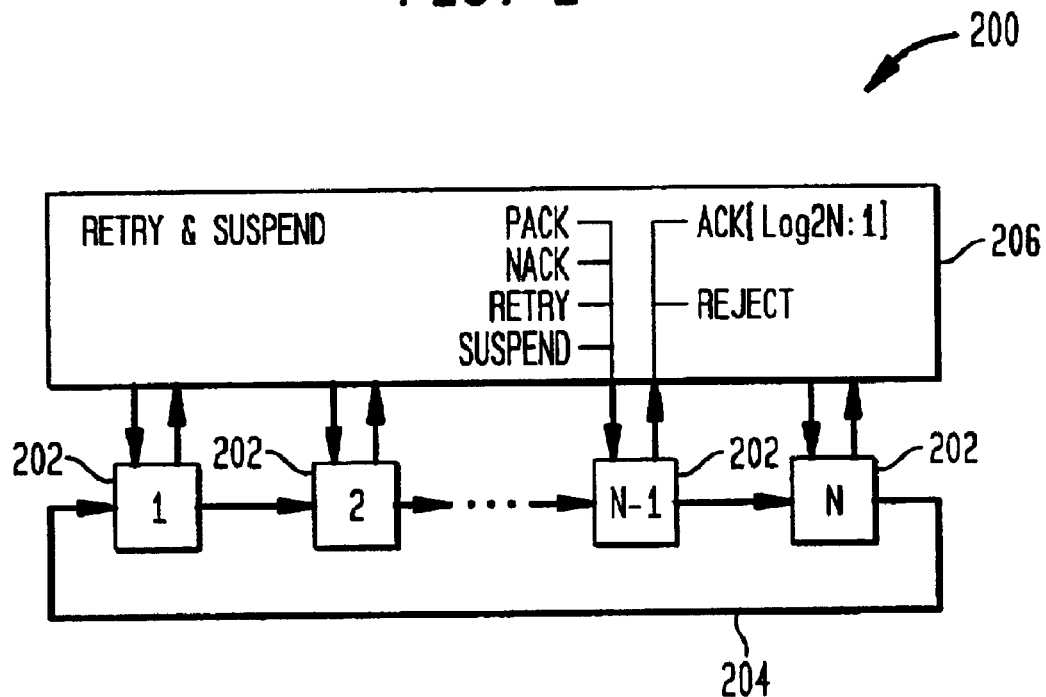
FIG. 2 illustrates a pipelined bus system in accordance with the present invention.

In a preferred embodiment shown in FIG. 2, a pipelined bus system 200 in accordance with the present invention consists of a chain of staged clients 202, labeled 1 to N, where each client 202 provides one or more continuously clocked stages along the chain forming a ring 204. Transfers occur peer-to-peer on a packet basis from a sending client (SC) to a receiving client (RC). Thus, there are no masters or slaves. A central retry and suspend module 206, as shown in FIG. 2, provides the mechanism for retry flow control. Each client in FIG. 2 could represent an entire ManArray 2×2 iVLIW processor and thus FIG. 2 shows an example of a multi-ManArray processing system (i.e., each client 202 is embodied as a system 100). Since each system 100 has two buses 183 and 191, then each client 202 in FIG. 2 requires two complete buses and retry and suspend modules as shown in FIG. 2.

Figure 3A:
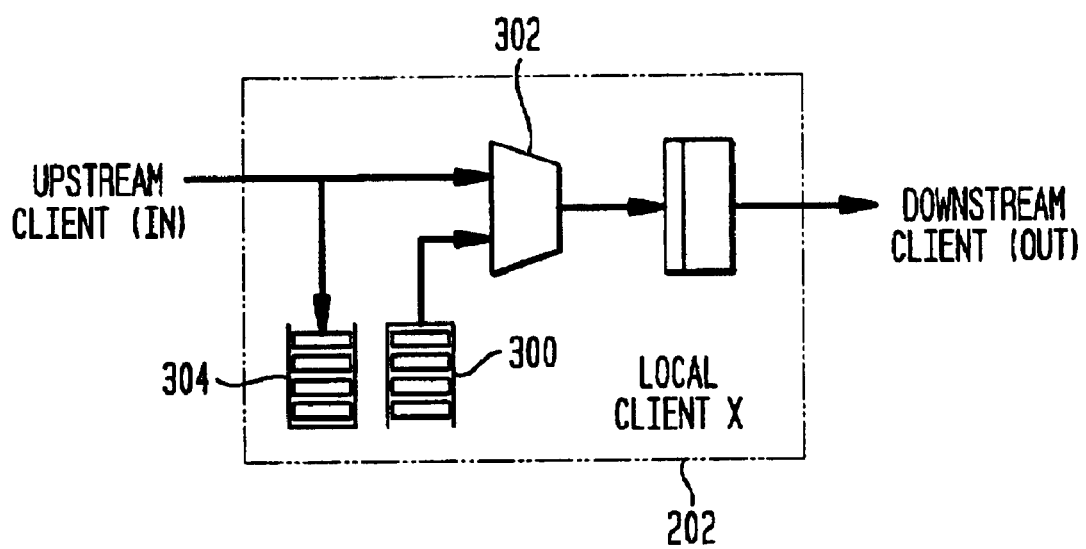
FIG. 3A shows the single local client in accordance with the present invention.

FIG. 3A shows further details of an exemplary single local client 202 in accordance with the present invention. As seen in FIG. 2, an upstream client sources data directly into the client 202, while a downstream client sinks data directly from client 202. Sending clients insert their packets into the ring one cycle at a time through multiplexer 302 when no immediate upstream packet cycles are detected. Each client has visibility to only its own neighboring upstream client. Prior to issuing a packet, an SC must have the entire packet buffered in buffer 300 and ready for complete transfer at bus clock speeds. To begin sending its packet, a client must wait until no upstream header or data cycle is detected. Received packets destined locally and not to be passed to the next client are stored in buffer 304.

Figure 3B:
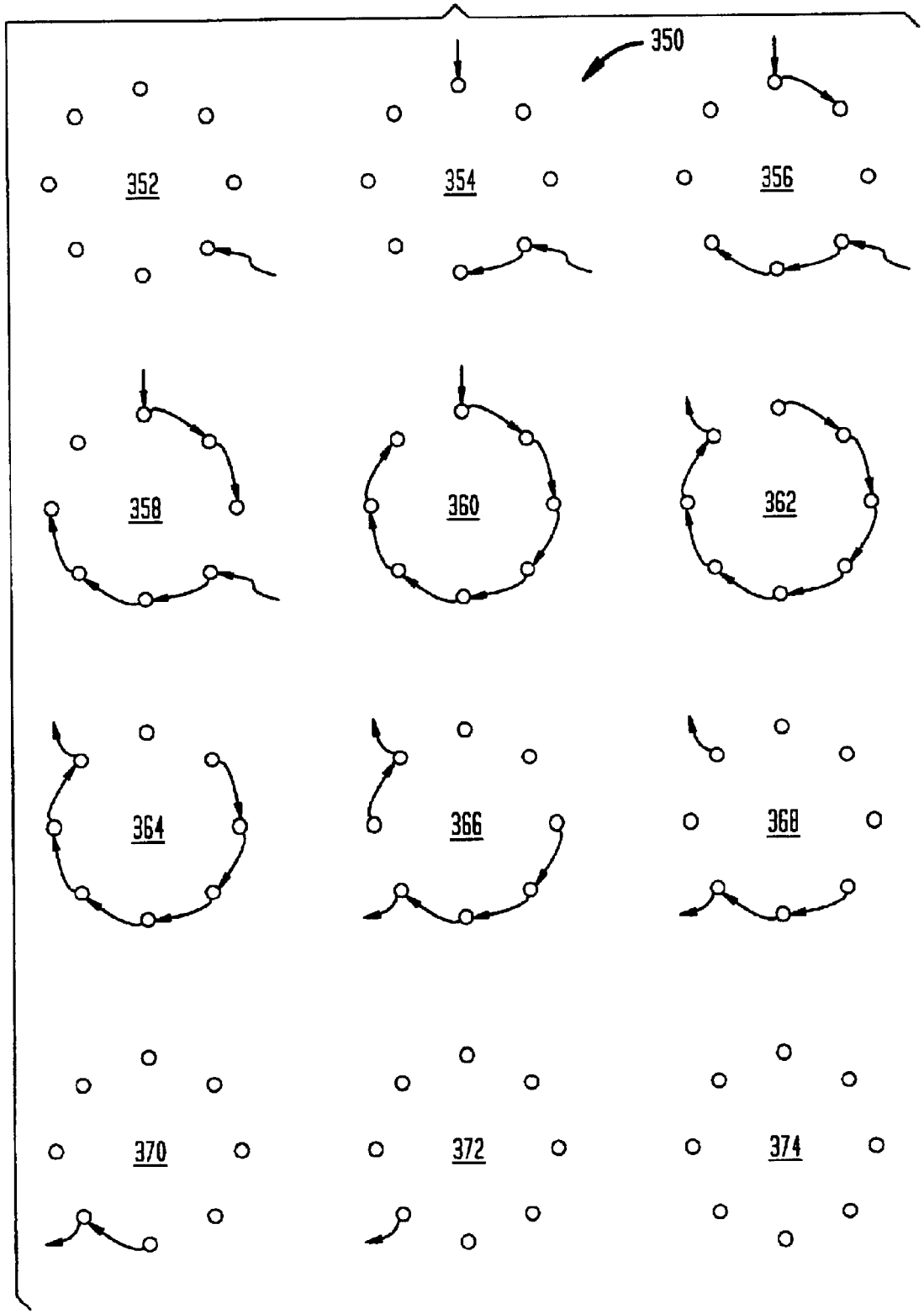
FIG. 3B shows a flow diagram of an exemplary concurrent data transfer utilizing a plurality of clients arranged in a ring in accordance with the present invention.

FIG. 3B shows a flow diagram 350 showing an exemplary concurrent data transfer utilizing a plurality of clients arranged in a ring. The flow diagram 350 begins at step 352 and proceeds to step 374. Step 352 shows the $1^{st}$ cycle of the lower packet entering the bus. Step 354 Find shows the $2^{nd}$ cycle of the lower packet and the $1^{st}$ cycle of the upper packet entering the bus. Step 356 shows the $3^{rd}$ cycle of the lower packet and the $2^{nd}$ cycle of the upper packet entering the bus. Step 358 shows the last cycle of the lower packet and the $3^{rd}$ cycle of the upper packet entering the bus. Step 360 shows no new cycles of the lower packet and the last cycle of the upper packet entering the bus. Step 362 shows all cycles of both packets advancing one stage with the $1^{st}$ cycle of the lower packet entering the bus. Step 364 shows all cycles of both packets advancing one stage with the $2^{nd}$ cycle of the lower packet entering the bus. Step 366 shows the $3^{rd}$ cycle of the lower packet and the $1^{st}$ cycle of the upper packet both exiting the bus. Step 368 shows the last cycle of the lower packet and the $2^{nd}$ cycle of the upper packet both exiting the bus. Step 370 shows the $3^{rd}$ cycle of the upper packet exiting the bus. Step 372 shows the last cycle of the upper packet exiting the bus. Step 374 shows that both packets have been completely transferred, encountering no conflicts.

Figure 3C:
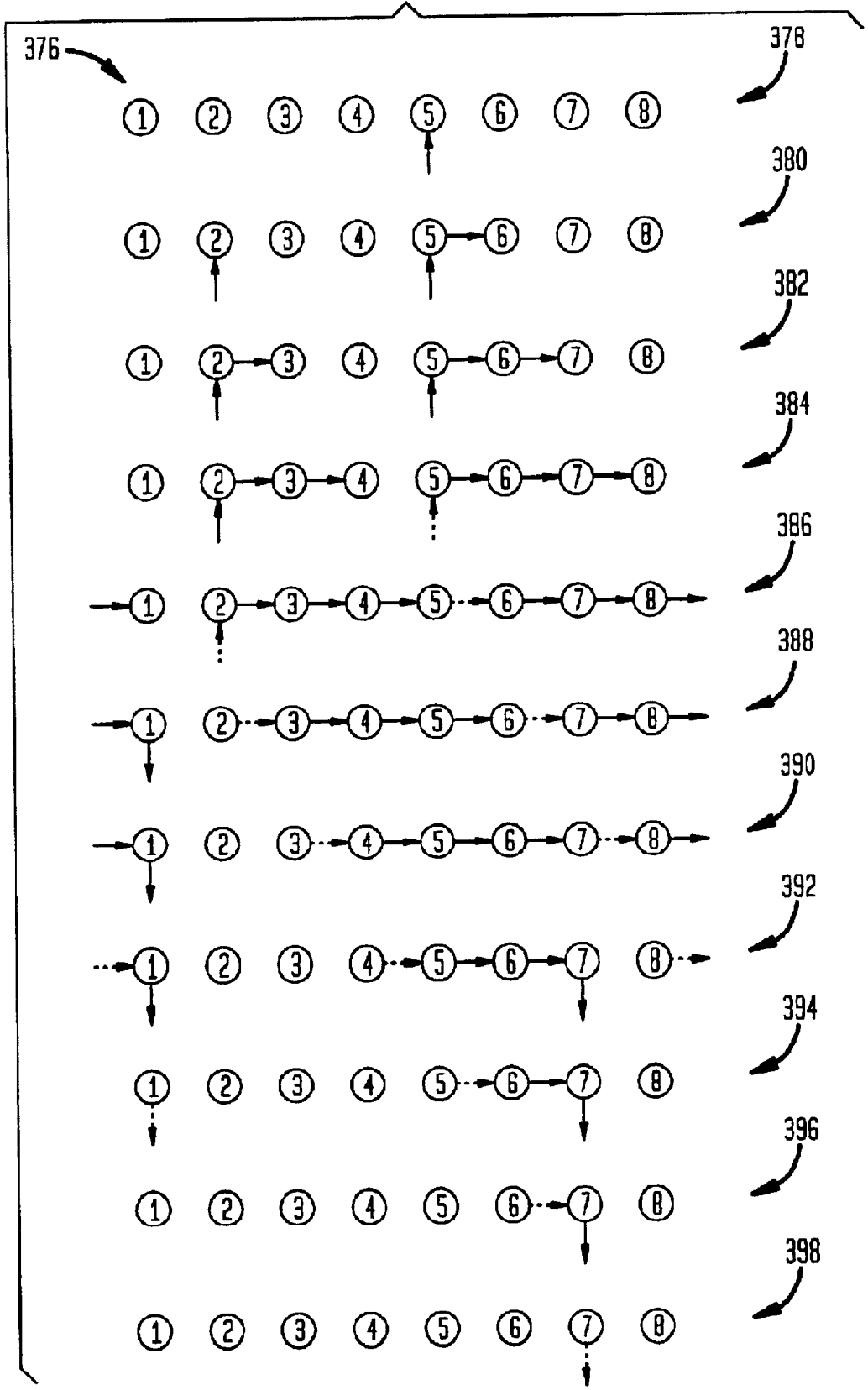
FIG. 3C shows a flow diagram of an exemplary concurrent data transfer utilizing a plurality of clients arranged in a line in accordance with the present invention.

FIG. 3C shows a flow diagram 376 showing an exemplary concurrent data transfer utilizing a plurality of clients arranged in a line with client 8 connected to its downstream client. The flow diagram 376 begins at step 378 and proceeds to step 398. In flow diagram 376, step 378 shows a 4-cycle packet entering at client 5 and destined for client 1. Steps 380–394 show the packet progression completing without conflict. Step 380 shows a 4-cycle packet entering at client 2 and destined for client 7. Steps 382–398 show the packet progression completing without conflict.

Figure 4:
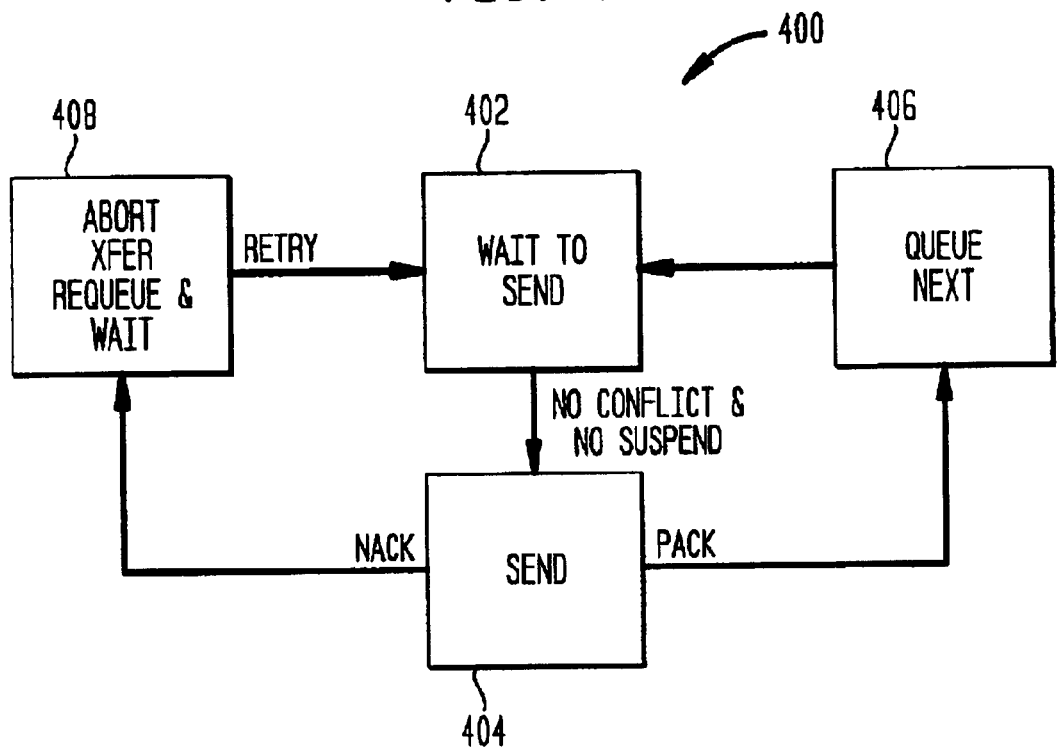
FIG. 4 shows a flow chart detailing the sequencing for packet transfers in accordance with the present invention.

FIG. 4 shows a flow chart 400 for a system, such as system 200, providing further details of the sequencing for packet transfers in accordance with the present invention. Operation begins in step 402 with the SC waiting to send a packet. Once a packet is sent in step 404, the SC will receive either a positive acknowledgement (PACK) that the packet was received properly, or a negative acknowledgement (NACK) that the packet was rejected. If the packet was received properly (PACK), the SC then prepares the next packet to be sent in step 406. If the packet was rejected (NACK), the SC must prepare to resend the same packet, as well as to discard any lingering data not yet not placed into the bus pipeline in step 408. The rejecting client is responsible for discarding all issued data cycles already inserted into the bus pipeline, from the rejected packet. Once the retry and suspend module 206 determines that it's time for the SC to retry its packet transfer, it asserts a retry signal to the client. A rejecting client, one that rejects another client's packet, is suspended to prevent that rejecting client from issuing subsequent packets until all clients it has rejected have successfully transferred once each.

Pipelined Bus Protocol

The pipelined bus of the present invention is a packet-switched multi-cycle bus. All information is transferred in single or indivisible multi-cycle packets, with each packet preferably consisting of one header packet and a variable number of data packets. The term indivisible indicates that all flow control is preferably effected on a packet-sized or greater than packet-sized basis. The header information is sent on the header control lines, and the first data is sent coincidentally on the data signals as shown in a timing diagram 500 of FIG. 5. The number of data cycles in a packet can be determined from the command and size fields in the header information. The pipelined bus is also a split-transaction bus, meaning that each transaction consists of a request packet followed by either no or one reply packet. There are no multiple reply packet transactions. Unified transactions are typically not allowed. In other words, the bus is never held waiting or idle for a reply packet. Multiple outstanding requests from each client are permitted, and are limited only by the size of the packet buffers.

Transactions on the pipelined bus are initiated by originator clients and serviced by destination clients. As a sending client, an originator issues a read request packet. As a receiving client, the targeted destination accepts the packet and satisfies the request. Then, as a sending client, the destination issues a read reply packet, to the receiving originator client, completing the transaction. Therefore, originator clients send request packets and receive reply packets while destination clients receive request packets and send reply packets. Clients may be an originator only client, a destination only client or a dual-type client. All types of clients are capable packet senders and receivers, and may be identified by an identification (ID) number. Dual clients need only one ID number, as the transaction types indicates originator and destination. Nonexistence of a receiving client results in the transfer of a packet completely around the ring. The sender detects the nonreceived packet by monitoring the upstream side for its own packet and then flags an error.

There are only three possible valid types of bus cycles throughout the bus ring, namely, header, data and mixed cycles. A header cycle is a cycle in which the header, and possibly associated data, signals represent the start of a valid packet transfer. A data cycle consists of only valid data signals, and represents the continuation of the packet data transfer. A mixed cycle is one in which a packet header is asserted coincident with valid data from a previous packet and therefore the header indicates a read request packet.

Originators formulate request packets comprised of the address, data, byte write enables, command and IDs. Once the packet information is assembled, a request packet is issued. In response to read request packets, destination clients generate reply packets. Write request packets do not generate reply packets, since positive acknowledgement is already included in the signaling, and no response data is required. Reply packet headers are identical to that of their corresponding request packet, except for setting the command reply bit CMND(0), as described in detail below. This eases reply header generation and originator transaction retirement.

Data can be transferred in any of the three cycle types: header, data or mixed. In a preferred embodiment, all data transfers have several common characteristics: the transfers are non-cache coherent; data must be self-aligned in the data field in a fixed, e.g., little endian fashion; and cache misses involve selectable fixed ordering or critical-word-first ordering, as described in detail below.

Figure 5:
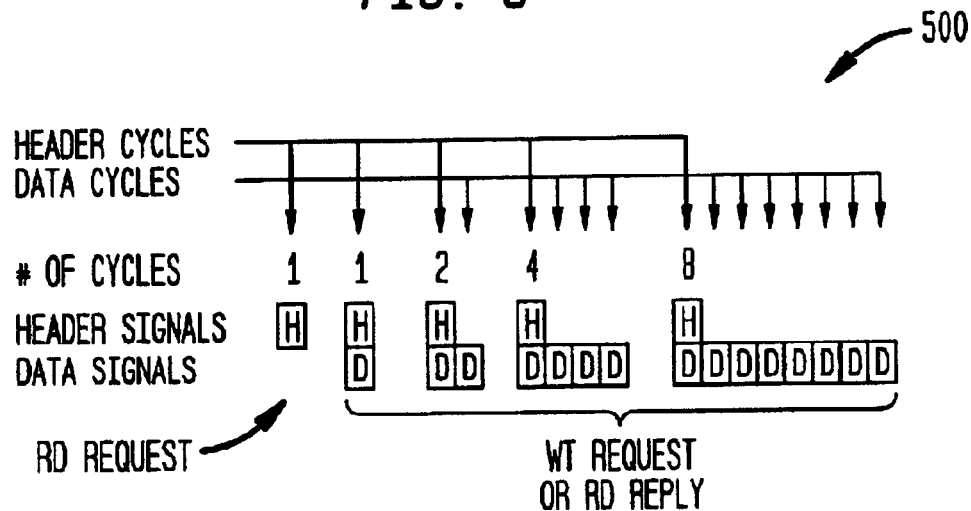
FIG. 5 shows a first timing diagram of a packet-switched multi-cycle bus in accordance with the present invention.

To maintain high efficiency, the pipelined bus of the present invention supports overlapped transmission of certain packet types. During multi-cycle packet transfers, additional header-only packets may be transmitted simultaneously via the header signals in a mixed cycle. FIG. 5 shows exemplary packet types for various sizes, and FIG. 6 includes timing diagram 600 showing exemplary packet overlapping possibilities. FIG. 600 shows a combination of many different packet types to illustrate how optimally mixtures of concurrent packet types can occur. It represents a snapshot in time of the various pipeline stages and their contents, comprised of 5 separate data packets of sizes 1, 1, 1, 4, and 8 data cycles, and 8 read request packets containing header cycle only and no data cycles. The data packets are shown combining into 15 contiguous bus cycles. The 8 read packet header cycles are then inserted into available unused cycles, or data cycles where they become a mixed cycle.

An SC may issue a packet when the upstream client is not sending a packet from either itself or from an upstream client. Given the distributed staging of the bus, it is possible to transfer as many packets concurrently as there are number of clients, assuming upstream adjacency of the SC to the RC.

When an SC is ready to transmit its packet, the SC issues the packet downstream whenever the upstream path is clear of any transfer. This conflict resolution occurs at each client independently without the need for central arbitration. Once an SC begins sending a packet, it must send the entire packet in consecutive cycles along the piplined chain, unless the packet is rejected. If the packet encounters a downstream client transferring a packet, the upstream packet gets rejected and must be retried by its SC. Due to this local conflict resolution, each client must provide sufficient queuing to retransmit the entire packet if the packet fails to arrive at its receiving client. Each SC must complete sending the entire packet, and receive a positive acknowledgement, prior to starting its next packet transfer. If the packet is rejected, the SC is responsible for termination of all unsent packet data cycles. This early termination capability reduces bus congestion due to rejected packets. A reject occurs when there is insufficient buffer space in the RC or when a packet collides with a downstream packet before it gets to its RC.

A downstream SC is responsible for detecting and reporting the rejection to the retry and suspend module. The retry and suspend module provides two recording arrays, retry and suspend, of bit accessible state for controlling rejected and rejecting clients. These arrays guarantee fairness in bus resource sharing while maintaining optimal bus usage.

Given the distributed nature of the bus and its associated retry flow-control mechanism, a client may have only one active packet transfer. A packet transfer is considered active during the time between issuance of the header cycle and return of positive acknowledgement (PACK) or negative acknowledgement (NACK). It represents only bus travel time, and not destination access time. Beyond this packet-level restriction guaranteed by each sending client, originating clients may have as many outstanding read transactions as it has reply packet buffer space. The only ordering requirement imposed on transactions is that their order be maintained between originator and destination. Ordering among transactions targeting multiple destination clients is not guaranteed. In one aspect of the present invention, within any single client, strict ordering among bus transactions may be maintained.

When requesting instruction cache-line fill data, the transaction size must be a power of two. Reply packet data is returned in "critical word first" order, where the first data cycle contains the word referenced by the starting address in the packet header. The remaining data cycles follow in order, modulo the packet size. For the following memory image,

| Location | Bus data | |
|---|---|---|
| 00000000 | xxxxxxxx | xxxxxxxx |
| . . . | | |
| 00000058 | xxxxxxxx | xxxxxxxx |
| 00000060 | 60616263 | 64656667 |
| 00000068 | 68696A6B | 6C6D6E6F |
| . . . | | |
| 000000F8 | xxxxxxxx | xxxxxxxx | the corresponding return data sequence for a 256-byte read block with an address of 0x64 on a 8-byte bus, is:

| Location | Bus data | |
|---|---|---|
| 00000060 | 60616263 | 64656667 |
| 00000068 | 68696A6B | 6C6D6E6F |
| . . . | | |
| 000000F8 | xxxxxxxx | xxxxxxxx |
| 00000000 | xxxxxxxx | xxxxxxxx |
| . . . | | |
| 00000058 | xxxxxxxx | xxxxxxxx |

This functionality is selectable by the client using the proper command code. It is the responsibility of the instruction cache controller to route the critical word to the processor while back filling the cache with the remaining data.

Flow-control mechanisms are required wherever there are resources accepting unsolicited data, yet having finite queuing capacity. Client packet buffers and the pipelined bus stages are resources requiring such mechanisms. Client packet buffers should be kept from overflowing and pipeline stages from packet corruption due to collisions. Originating clients may send multiple outstanding read requests to PB clients, but only to the extent where they have reserved corresponding reply packet buffer space. Therefore, originators flow-control their own reply packet buffers. However, request buffers in destination clients accept unsolicited requests and must have a method to prevent buffer overflows. Destination client buffers are not required to be sized large enough to avoid overflow situations, and only system performance goals affect buffer sizing beyond minimum. The destination clients can reject request packets if there is insufficient buffer space for either header or data. For the bus itself, clients control the flow of upstream packets by rejecting them, and draining any remaining incoming data cycles, when they would otherwise conflict with their own packet currently being sent.

Pipelined Bus Signal Description

In a preferred embodiment, for each client, the pipelined bus consists of 123 chained signals comprising 73 data signals and 50 header signals, nine point-to-point acknowledge and retry signals, and two clock and reset signals. Except clock, all signals are considered active high (logical 1) when asserted unless otherwise specified. All client-exiting signals are sourced directly from the local flip-flip. All client-entering signals are used internally and most are connected to the chain multiplexer.

FIG. 7C shows a table 720 of the signals of the data portion of the pipelined bus in accordance with the present invention. A client stages them into its bus pipeline register during each of its data, mixed and potentially header cycles. FIG. 7A shows a table 700 which shows the relationship between the generation of a data enable signal (DENA) and a header enable signal (HENA). Bit and byte numbering conventions are shown in chart 710 of FIG. 7B.

FIGS. 7D and 7E show a table 730 of the signals which represent the header portion of the pipelined bus. The header is comprised of address, command, size and identification signals and is qualified with HENA.

FIG. 7F shows a table 740 of the signals which comprise the retry and suspend module control signals of the bus. These signals are all point-to-point signal connections. Each signal exists uniquely for each client. FIG. 7G shows a table 750 of the signals which are common inputs to all clients and the retry and suspend module.

Client Module

Figure 8A:
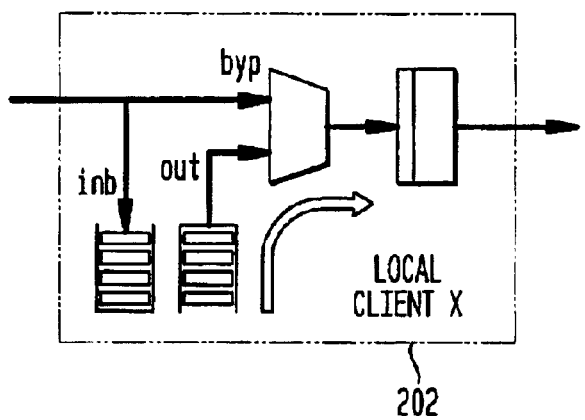
FIGS. 8A–8E and 9 show six basic packet routings to be controlled by a client in accordance with the present invention.
Figure 8B:
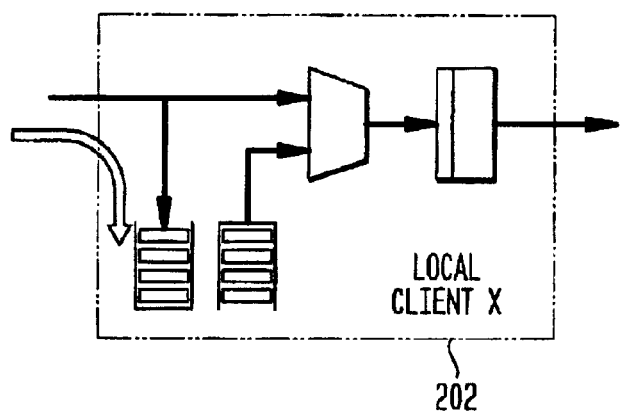
Figure 8C:
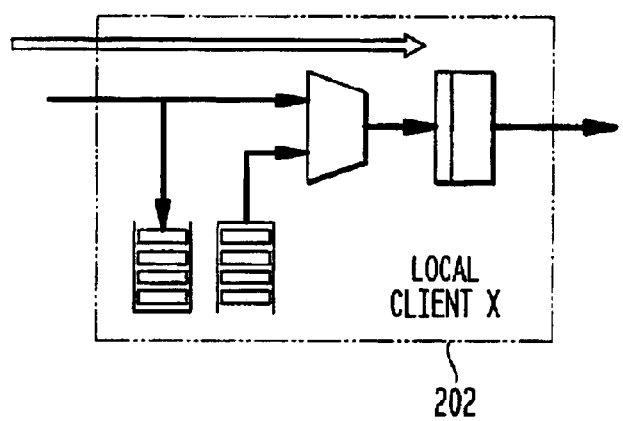
Figure 8D:
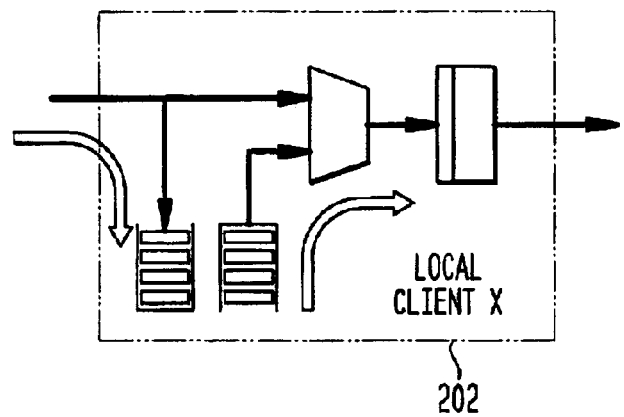
Figure 8E:
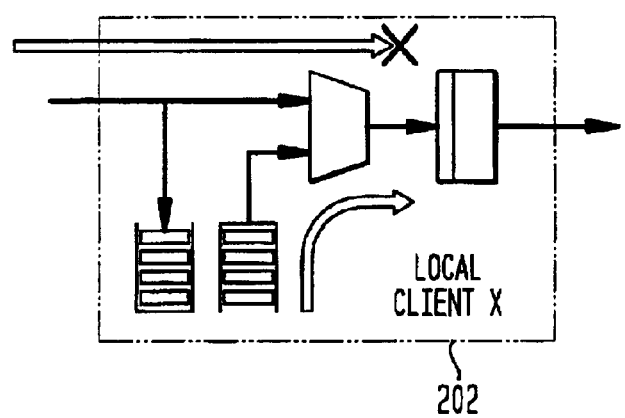
Figure 9:
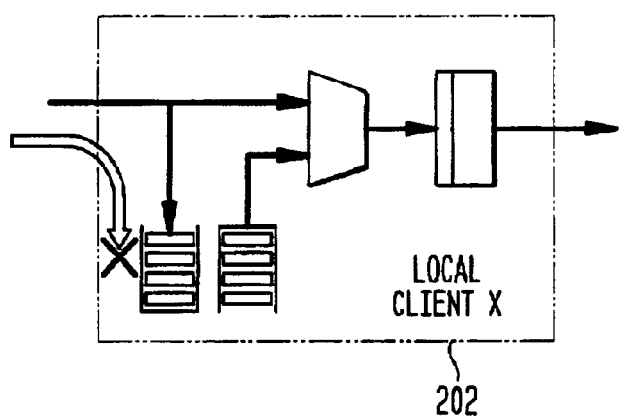

To maintain high-speed clocking along the bus, each client interface includes the logic circuitry necessary to route packets properly. There are six basic packet routings to be controlled. FIG. 8A shows the local client to outbound routing. When there is no upstream packet arriving, a client may send its packet as shown in FIG. 8A. FIG. 8B shows the upstream to inbound routing. When an upstream packet arrives at a receiving client, it must be immediately buffered as shown in FIG. 8B. FIG. 8C shows the upstream to downstream routing. When an upstream packet arrives at a non-receiving client, the packet should be immediately routed as shown in FIG. 8C. FIG. 8D shows the local client to outbound routing in conjunction with the upstream to inbound routing. While an upstream packet arrives at an RC, the RC may also independently send its own packet as shown in FIG. 8D. FIG. 8E shows the local client to outbound routing in conjunction with a rejected upstream packet. Once an outbound packet begins, a colliding upstream packet must be rejected as shown in FIG. 8E. FIG. 9 shows the upstream to inbound routing with packet rejection. When an upstream packet encounters the receiving client with insufficient buffer space, the packet must be rejected as shown in FIG. 9.

All packet routing decisions must be made in a single cycle. All reporting decisions, including rejection and completion, should also be made in a single cycle, but may be staged further if necessary. The pipelined bus protocol allows this option, but performance may be diminished slightly.

Retry and Suspend Module

The centrally located retry and suspend module 206 contains routing logic for both normal and reject acknowledgement from the receiving client (RC) to the sending client (SC). The retry and suspend module 206 also contains the mechanism to provide SC retry initiation and suspension to guarantee retry fairness and avoid client starvation. The communication signals between clients and the retry and suspend module 206 are shown in FIG. 2.

Figure 10:
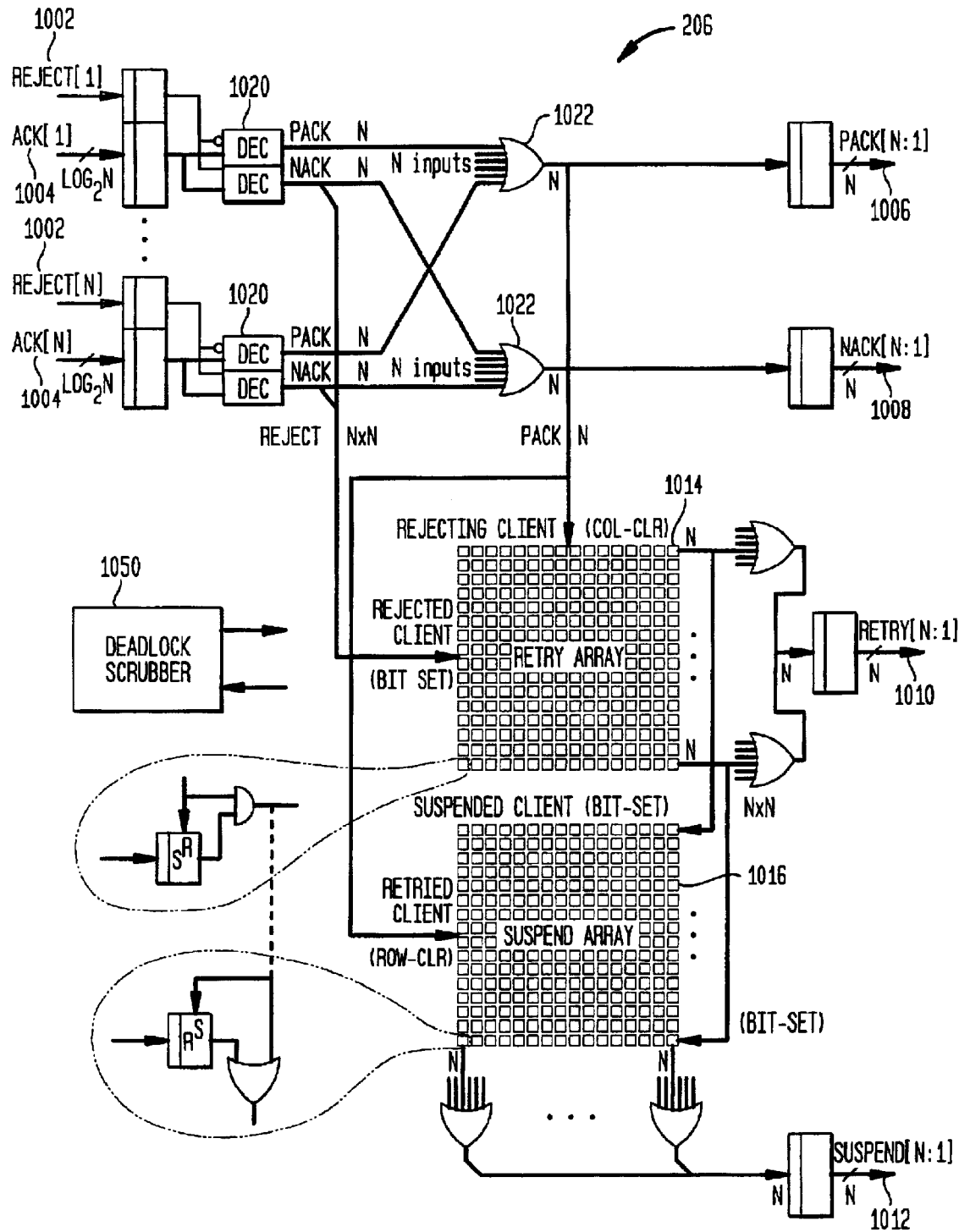
FIG. 10 shows a block diagram of a retry and suspend module in accordance with the present invention.

FIG. 10 shows a block diagram of the retry and suspend module 206 in accordance with the present invention. The inputs REJECT 1002 and ACK 1004 are received from each client 202. The RSM 206 provides outputs PACK 1006, NACK 1008, RETRY 1010 and SUSPEND 1012 to each client 202. The RC indicates a successful packet transfer by asserting the sending ID onto the ACK[3:0] lines for one cycle, while keeping REJECT de-asserted.

Prior to reaching its RC, a packet may be rejected by a downstream client, if it collides with that downstream client's packet transfer in progress. Also, the RC may reject a packet if it has insufficient buffer space for the entire packet. The rejecting client indicates a reject by assertion of the sending ID onto the ACK[3:0] lines for one cycle, while simultaneously asserting REJECT. Note that only one client will ever reject a packet transfer, since the packet must be rejected in total by the rejecting client and a client may not reject any part of a packet once the header has been bypassed to downstream clients.

The RSM maps the ACK signals with asserted REJECT, to NACK to the proper SC. The RSM maps the ACK signals with de-asserted REJECT, to ACK to the proper SC.

The module 206 also includes a retry array 1014 and a suspend array 1016. These arrays of bit accessible state reflect the conditions of both rejected and rejecting clients. The retry array 1014, which records "who rejected whom", determines when rejected clients 202 may retry their packets, and signals it to the appropriate client with assertion of RETRY to the previously rejected client. The suspend array 1016, which records "who is suspending whom", determines when a rejecting client 202 is allowed to send its next packet. By suspending issuance of the next packet in any client the module 206 guarantees fairness in PB resource sharing.

Each client 202 sends an encoded non-zero ACK to designate which client is being acknowledged (PACK or NACK). If REJECT is also asserted, then NACK is generated at the output of each decoder 1020; otherwise PACK is generated. Since it's impossible for multiple clients to be acknowledging the same client in the same cycle, a simple ORing of the decoder outputs by gates 1022 is sufficient to generate PACK or NACK to the proper SC.

Staging is required for all RSM inputs and outputs to maintain high bus clock frequency. While this staging increases individual client packet-to-packet (and retry) latency, it has only second-order negative effects on PB performance as a whole.

If a NACK[i] is generated, the rejecting client is indicated by the respective set of input signals asserted, and the rejected client is indicated by the actual coding on the respective ACK[i] signals. All $N^2$ signals are used to set appropriate bits in the retry bit array 1014.

Figure 11:
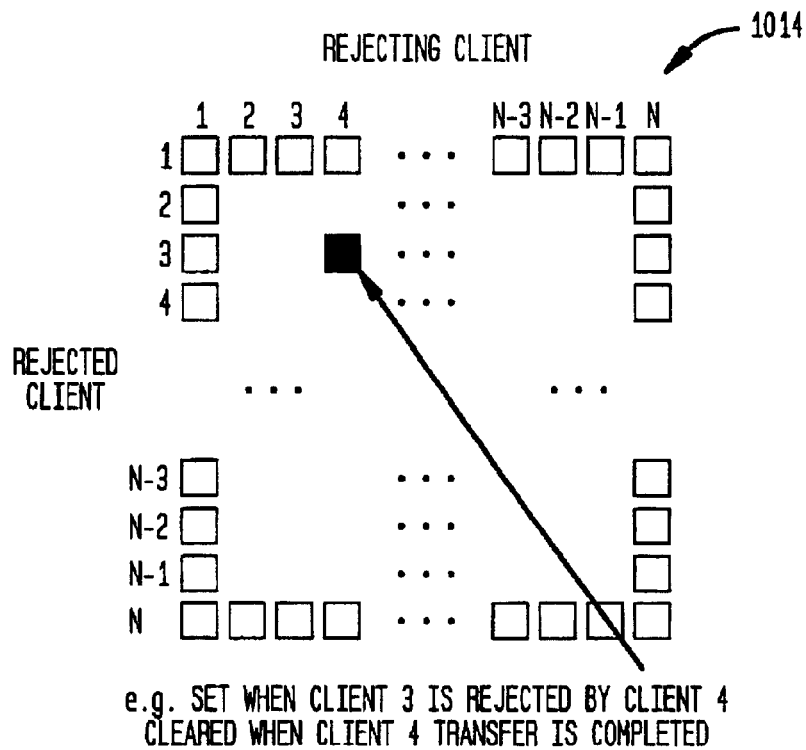
FIG. 11 illustrates a retry bit array in accordance with the present invention.

The retry bit array 1014 is shown logically in FIG. 11. Each array row reflects retry conditions for one client on the bus, with row i representing client i. Each array column reflects which client caused a packet rejection, with column j representing client j.

For example, if client 4 rejects a packet transfer from sending client 3, client 3 receives NACK (and prepares to retransfer the packet) and the bit is set as shown in the figure. This indicates that client 3 is waiting for client 4 to complete its packet transfer. Upon completion of client 4 packet transfer, the bit in the retry array is cleared, the RETRY signal is asserted to client 3, and the corresponding bit in the suspend array is set.

Figure 12:
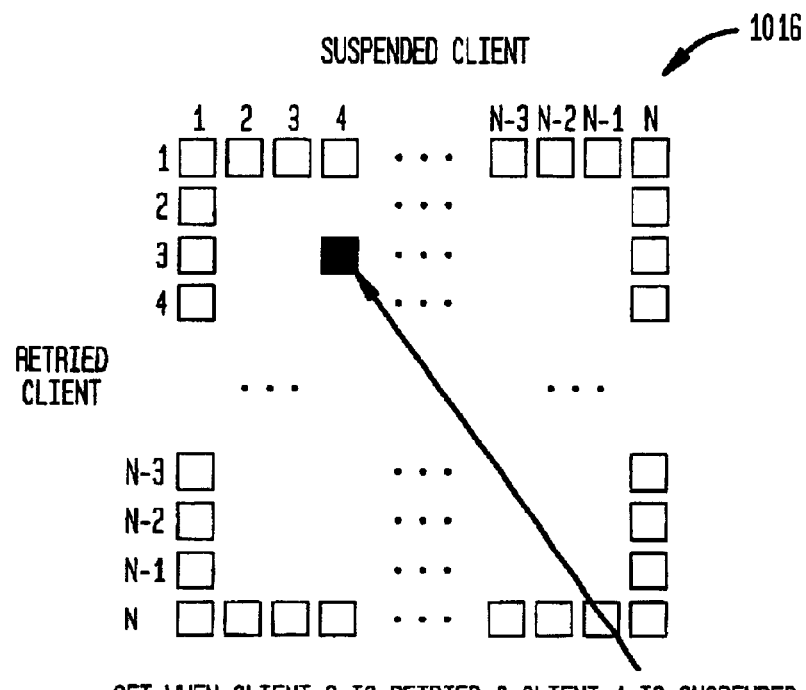
FIG. 12 illustrates a suspend bit array in accordance with the present invention.

The suspend bit array 1016 is shown logically in FIG. 12. Each array row reflects which clients are being retried, with row i representing client i. Each array column reflects which client is under suspension, with column j representing client j. When any bit in a column is set, that (column) client is suspended from issuing another packet on the bus. Therefore, client 4 is suspended from further transfers until client 3 has completed. When client 3 has completed, the corresponding row bits in the suspend array are cleared. When all row bits of each column are cleared, the corresponding suspend is deasserted to that client. If an RC rejects packets due to insufficient buffer space, when space becomes available the RC must send a completion ACK to its own ID to allow retry of the packets it has rejected.

Figure 13:
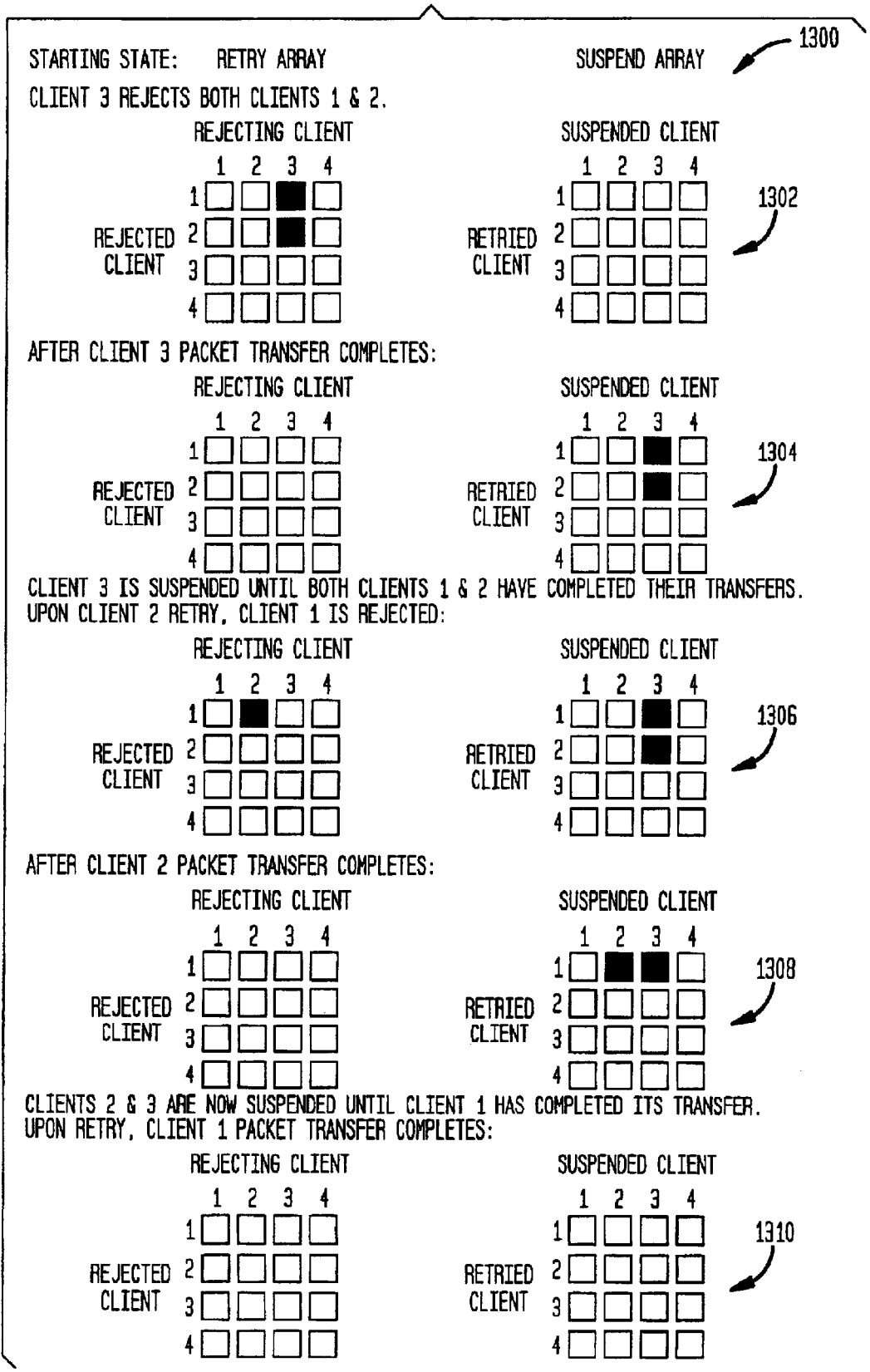
FIG. 13 shows a n first array sequence in accordance with the present invention.

Occurrences of multiple linked client rejects is possible. For example, assume that client 3 rejects both client 1 and client 2, creating a condition where both clients 1 and 2 will be retried after client 3 is done. Client 3 will be suspended from further packet transfers to guarantee that both clients 1 and 2 have an adequate chance at transferring once each prior to resumption of client 3. This scenario is shown in an array sequence 1300 of FIG. 13. As shown by array state 1302, client 3 rejects both clients 1 and 2. As shown by array state 1304, after client 3 packet transfer completes client 3 is suspended until both clients 1 and 2 have completed their transfers.

Upon client 2 retry, client 1 is rejected, as shown by array state 1306. After client 2 packet transfer completes, clients 2 and 3 are now suspended until client 1 has completed its transfer, as shown by array state 1308. As shown by array state 1310, upon retry, client 1 packet transfer completes.

Figure 14B:
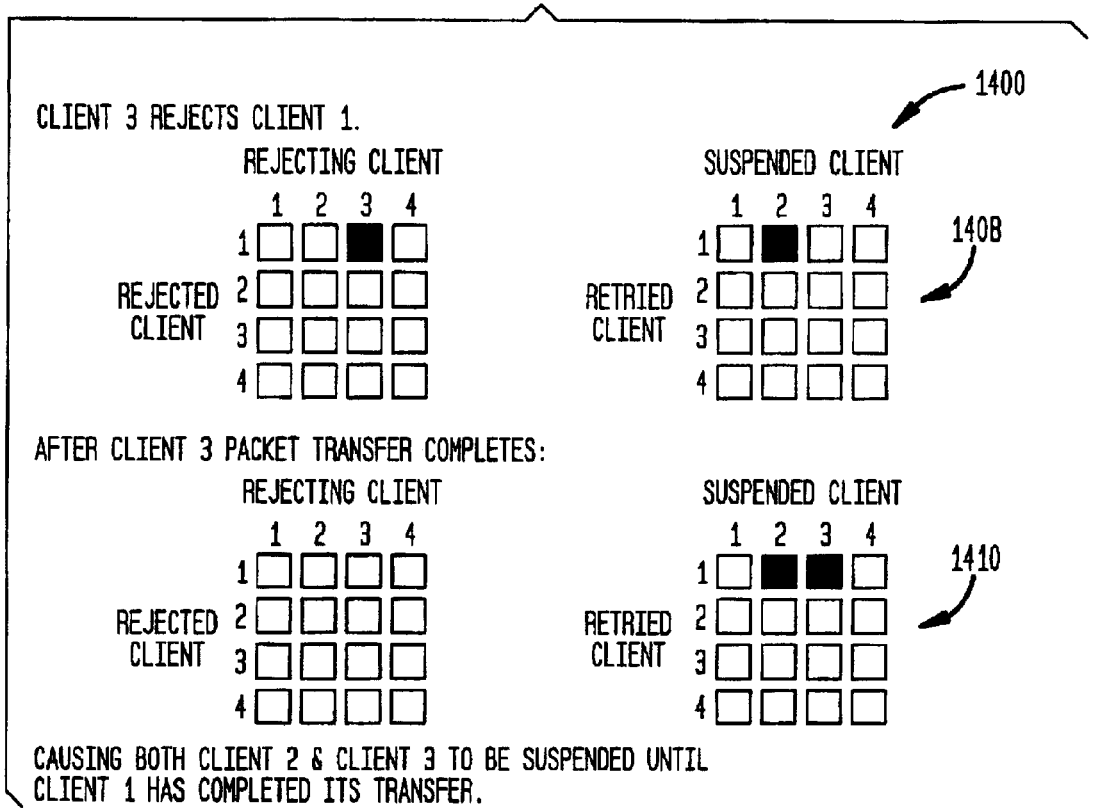

In a second example, as shown in array sequence 1400 of FIGS. 14A and 14B, assume that client 1 and 2 request simultaneously, and client 3 rejects client 2, while client 2 rejects client 1. This creates a condition where client 2 will be retried after client 3 is done, and client 1 will be retried after client 2 is done. The initial state is shown in array state 1402. After client 3 has completed the packet transfer, client 3 is suspended until client 2 has completed its transfer, as shown in array state 1404. Upon retry, client 2 packet transfer completes and client 2 is suspended until client 1 has completed its transfer, as shown in array state 1406. In this example, client 1 was blocked by client 2, and not by client 3, as in the first example. However, since client 3 is no longer suspended, client 3 could possibly issue another packet and reject client 1 again, leading to some unfair, but not starving, blocking occurrences for compound rejection sequences. Given a new packet issued by client 3, client 3 rejects client 1, as shown in array state 1408. After client 3 packet transfer completes, both client 2 are client 3 suspended until client 1 has completed its transfer, as shown in array state 1410. In an alternate embodiment, a modified setting of suspend array bits may be utilized. By recognizing the linkage between the rejections of client 1 and 2, the array state 1408 last step could be removed, thus avoiding any unfairness.

Figure 15:
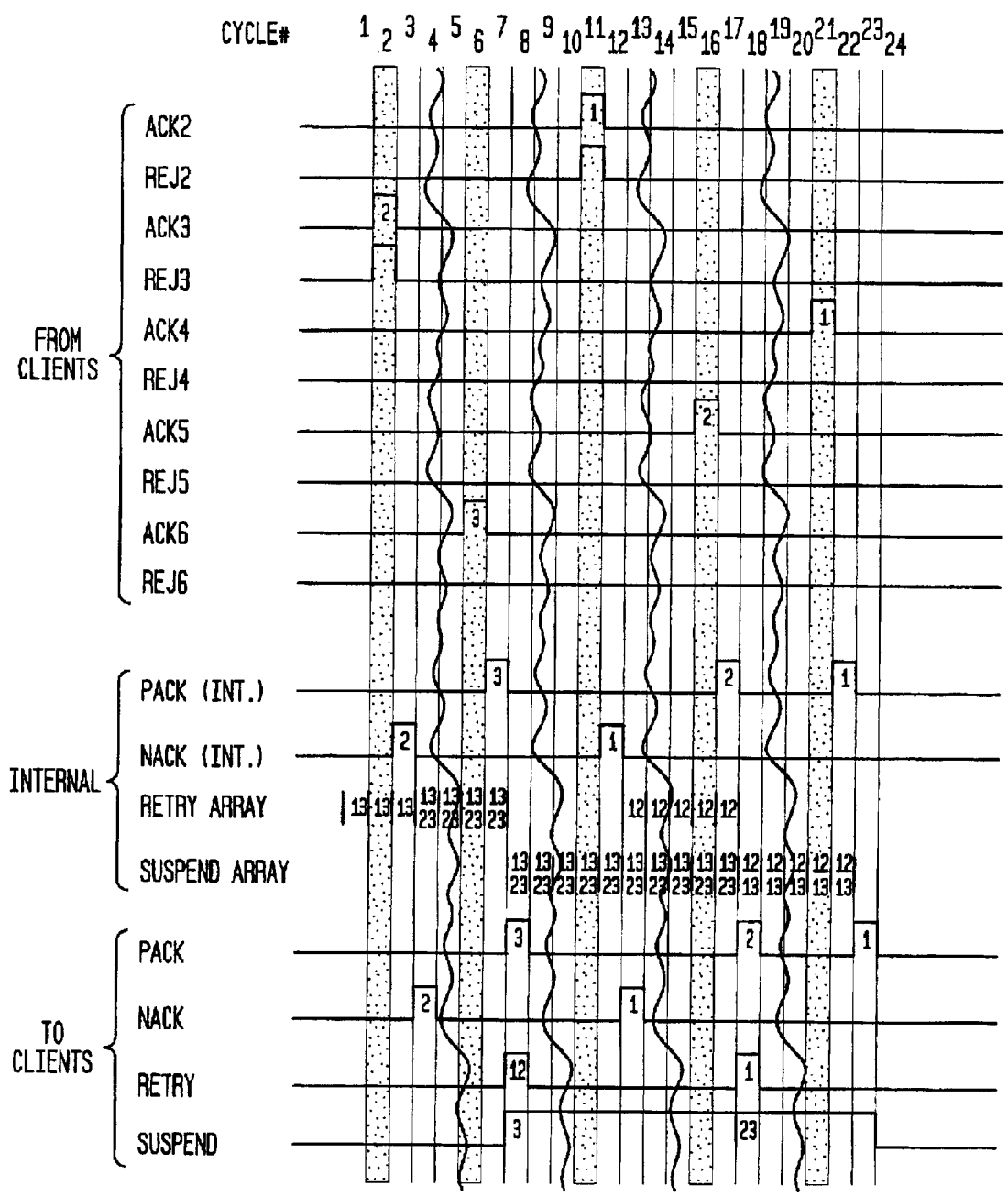
FIG. 15 shows an interface timing diagram in accordance with the present invention.

FIG. 15 shows an interface timing diagram 1500. The numbers in the waveforms represent the encoded identification values of the specific sending clients and the signal name suffixes represent specific receiving clients. The internal retry array represents the state of the array; where number-pair (X,Y) is interpreted as $SC_x$ was blocked by $RC_y$. The suspend array represents its internal state where number-pair (M, N) is interpreted as client N is suspended by client M. Timing diagram 1500 provides details for a sequence of three packet transfers from clients 1,2 and 3, sending to clients 4,5, and 6 respectively. The top portion shows all of the signals sent from the clients to the retry and suspend module. The middle portion shows important internal signals and state in the retry and suspend module. The bottom portion shows all of the signals sent from the retry and suspend module to the clients.

Client 3 had previously rejected client 1, and the retry array shows client 3 rejecting SC1 (13). Client 3 then completes its transfer while rejecting client 2, as described in detail in the following two paragraphs.

The rejection is shown during cycle 2 as an assertion of both ACK3 and REJ3. After staging in the input register, the internal NACK causes the rejection to be stored in the retry array as (2,3), and the NACK to be sent back to SC2 during cycle 4. The retry array now shows client 3 rejecting both SCI (13) and SC2 (23).

The completion is shown during cycle 6 when client 6 sends ACK6 without assertion of REJECT6 designating that client 3 has completed its packet transfer to client 6. After staging in the input register during cycle 7, PACK (int.) copies the retry array client column 3 bits to the corresponding suspend array bits, clears retry array column 3 bits which reset the 2 bits in client rows 1 and 2, and sends the retry signal to clients 1 and 2 during cycle 8. The PACK and SUSPEND signals are also sent to client 3, to complete its transfer as well as hold off its next packet transfer until clients 1 and 2 are both complete. The suspend array state is now set to 13 and 23.

Upon receiving the RETRY signals, both clients 1 and 2 retry their transfers. Due to their simultaneous requests, client 2 then completes its transfer, while rejecting client 1. This process is described in greater detail in the following two paragraphs.

The rejection is shown during cycle 11 as assertion of both ACK2 and REJ2. After staging in the input register, the internal NACK causes the rejection to be stored in the retry array as (1,2), and the NACK to be sent back to SC1 during cycle 13. The retry array now shows client 2 rejecting only SC1 (12).

Completion of the client 2 transfer is shown during cycle 16 when client 5 sends ACK5 without assertion of REJECT5 designating that client 2 has completed its packet transfer to client 5. After staging in the input register during cycle 17, PACK (int.) copies the retry array client column 2 bits (1,2) to the corresponding suspend array bits, clears retry array row 2 bits which resets the bit in client row 2, and sends the retry signal to client 1 during cycle 18. The PACK and SUSPEND signals are also sent to client 2, to complete its transfer as well as hold off its next packet transfer until client 1 is complete. Since client 2 has now completed its transfer, the corresponding suspend array bits are cleared in row 2 (2,3), to allow clients suspended by client 2 (i.e. client 3), to send another transfer if it is not blocked by another client (which happens to be true in this example; it is still blocked by client 1). The suspend array state is now set to 12 and 13.

Finally, with clients 2 and 3 still suspended until client 1 successfully transfers, client 1 completes its transfer, as shown during cycle 21. Once client 1 is notified with PACK during cycle 23, both client 2 and 3 suspensions are released. Since client 1 has now completed its transfer, the corresponding suspend array bits are cleared in row 1 (1,2) and (1,3), to allow clients suspended by client 1 (i.e. clients 2 and 3), to send another transfer.

Deadlocks

Given the aggressive concurrent nature of the access protocol of the present invention, it is possible for multiple rejected clients to deadlock depending upon their relative destination and timing. For example, client 1 was rejected by client 5, while client 5 was rejected by client 12, while client 12 was rejected by client 1. The retry array bits would remain set with no normal acknowledge to clear them. When this condition occurs, it holds off the respective clients, thus keeping the pipeline bus free for all other transfers, but unfortunately the deadlocked clients never get retried.

Figure 16:
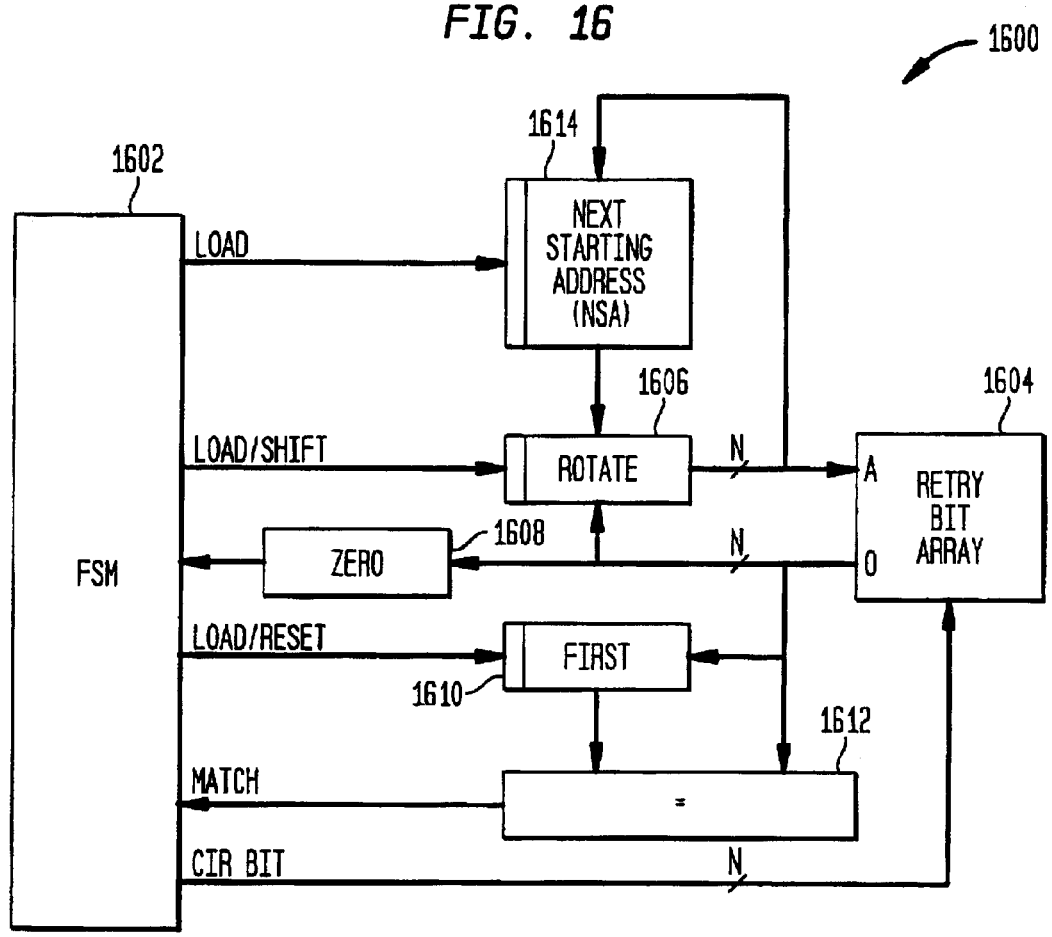
FIG. 16 shows a block diagram of a retry deadlock scrubber finite state machine in accordance with the present invention.
Figure 17:
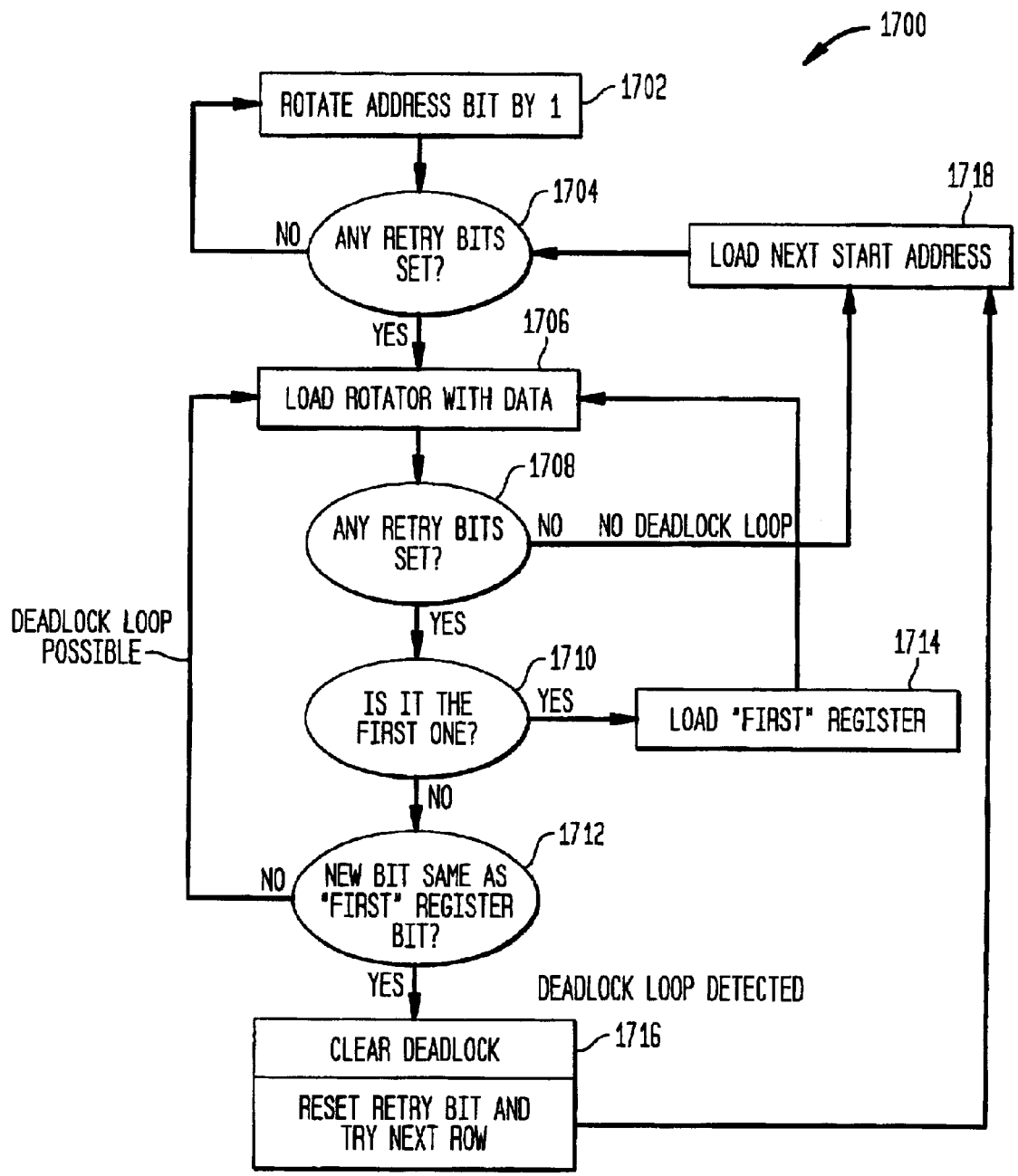
FIG. 17 shows a flow diagram for a retry deadlock scrubber finite state machine in accordance with the present invention.

One solution to this problem is to include a retry deadlock scrubber module 1050 as shown in FIG. 10. This module 1050 monitors the retry array 1014 in the background, and when it detects a retry deadlock condition, it simply clears one of the retry array bits, thus breaking the deadlock. FIG. 16 shows a block diagram 1600 which includes the retry deadlock scrubber finite state machine (FSM) 1602 and associated logic. FIG. 17 shows a flow diagram 1700 for the finite state machine 1602. Block diagram 1600 shows a finite state machine (FSM) that monitors and controls the associated logic: rotator 1606, zero-detector 1608, first register 1610, first match detector 1612, next state address (NSA) register 1614, and retry bit array 1604.

The rotator 1606 is a register that contains as many bits as there are numbers of rows in the retry bit array 1604. It is used to directly select all of the column bits from any one specific row in the array. Due to the nature of operation of the retry and suspend module, one and only one bit in any row may be asserted. The remaining column bits are zero.

The zero-detector 1608 determines if any of the outputs of the retry bit array 1604 are non-zero. Non-zero indicates a client blockage condition.

The first register 1610 is used to record the state of the retry bit array 1604 outputs when the first blockage of a suspected deadlock loop is encountered.

The first match detector 1612 determines if the outputs of the retry bit array 1604 are equal to the first register. When equal, a probable deadlock loop has been detected.

The NSA register 1614 records the address of the next retry bit array 1604 location to be checked. It is recorded from the current address when a potential deadlock blockage is first detected, and is used to continue sequential blockage checking after the potential deadlock is cleared or otherwise determined not to be a deadlock.

Scrubbing process 1700 is shown in FIG. 17. There are three primary pieces to the process: the top portion performs sequential location checking as depicted in steps 1702–1704, the middle portion performs potential deadlock detection as depicted in steps 1706–1714, and the bottom portion performs deadlock elimination and is depicted in steps 1716–1718.

The top portion, steps 1702–1704, addresses a location in the retry bit array 1604 with rotator 1606, while zero-detector 1608 monitors whether any column bits are asserted. Only one bit in the rotator 1606 is asserted and the array is linearly addressed, with each bit selecting one unique row. If no column bits are asserted in a row, the rotator 1606 rotates by one position and addresses the next sequential next row. For example, the rotator 1606 sequence is 01000, 00100, 00010. . . .

When a non-zero bit is detected in the top portion (indicating a client blockage), the current rotator 1606 contents are recorded in the NSA register 1614, and control is transferred to the middle portion of the flow diagram, steps 1706–1714. In this portion, step 1706 loads the array output into the rotator 1606 for further deadlock checking.

Since the retry bit array 1604 is a square array having the same number of column as it has rows, loading the rotator 1606 is a simple direct bit-for-bit store. The new address in the rotator 1606 accesses a different array location.

If the array output is zero in step 1708, then no deadlock exists, and control is returned back to the top portion of the flow diagram. The next rotated address is loaded into the rotator 1606, to continue checking locations from the point where control was transferred to the middle portion.

However, if the array output is non-zero in step 1708, then a potential deadlock may exist and further processing in the middle portion is required. If this is the first in a sequence of non-zero outputs to be detected in step 1710, then the array output is loaded into the first register 1610 in step 1714, the array outputs are loaded into the rotator 1606, and control is transferred back to step 1706 where the process continues.

If the non-zero array output is not the first in a sequence of non-zero outputs to be detected in step 1710, then the output is checked in step 1712 to determine if it matches the first register contents. If it doesn't match, then a potential deadlock may still exist and further processing in the middle portion is required, and control is transferred back to step 1706 again. If it matches in step 1712, then a deadlock has been determined and control is transferred to the bottom portion of the flow diagram, in step 1716.

In step 1716, the FSM clears the asserted bit in the current retry bit array 1604 row, thus eliminating a specific client blockage and therefore the deadlock. The rotator 1606 is loaded with the NSA register in step 1718, and processing continues in the top portion of the flow diagram.

Figure 18:
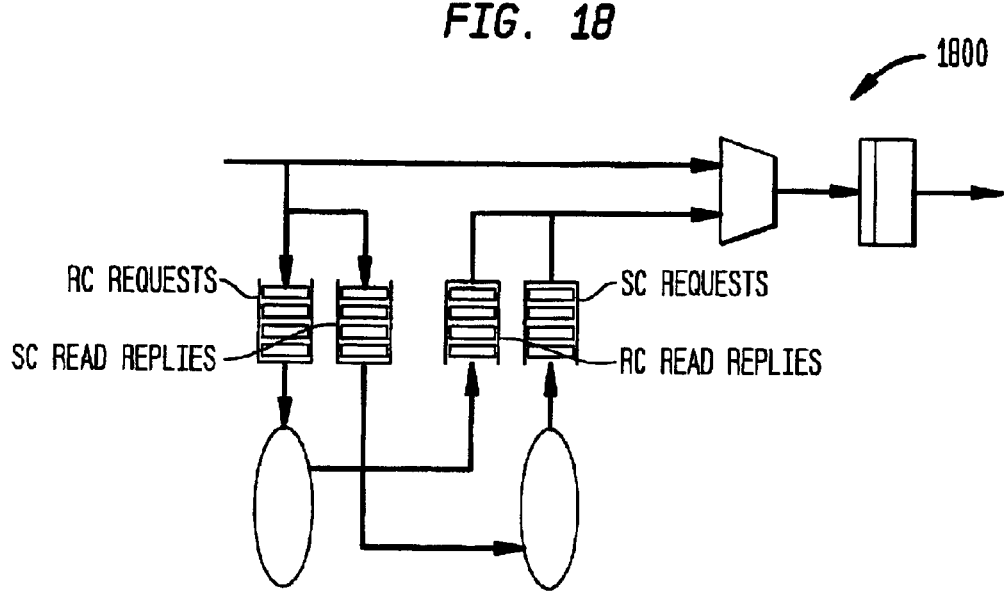
FIG. 18 shows a queuing configuration in accordance with the present invention.
Figure 19:
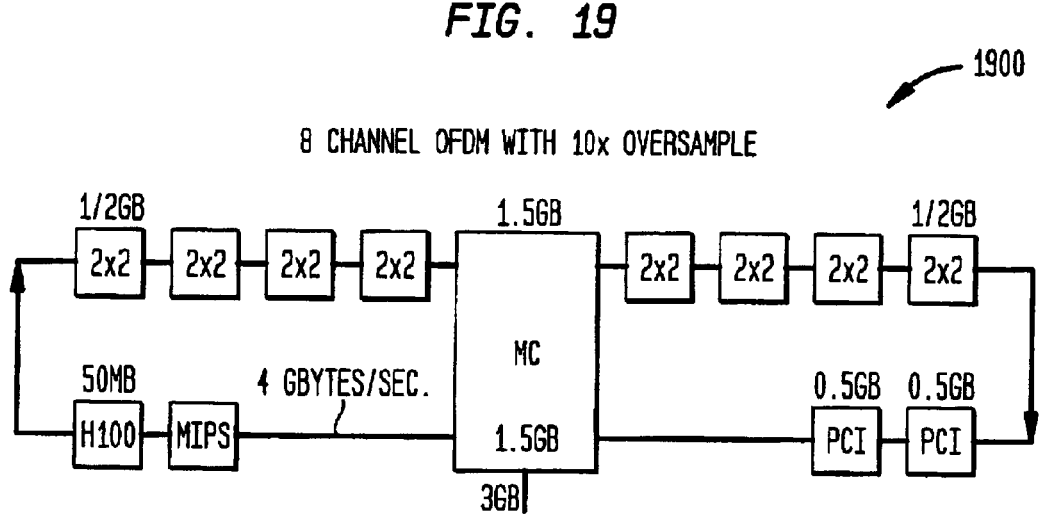
FIG. 19 shows a exemplary processing system in accordance with the present invention.

Another area of potential deadlock occurrence is with regard to the queuing structures used in the clients. Care must be taken in peer-level multi-client designs to avoid situations where deadlocks occur, such as a "deadly embrace" where outstanding read reply packets stall clients from servicing inbound read request packets from another client. This occurrence is a typical dual client deadlock situation to be avoided. A queuing configuration 1800 to avoid this situation is shown in FIG. 18. This approach separates remotely generated transactions from the locally generated ones. FIG. 19 shows an exemplary processing system in accordance with the present invention.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. A processing apparatus comprising:
   a plurality of staged clients;
   a pipelined bus connecting the staged clients, the pipelined bus allowing packet data transfers between the staged clients, each staged client connecting to an upstream client and a downstream client, a staged client sending packet data to its downstream client as long as the upstream client is not sending packet data destined to another staged client other than the staged client; and
   a retry and suspend module connected to the plurality of staged clients, the retry and suspend module controlling the packet data transfer retries between staged clients utilizing control signals received from a staged client recognizing a conflict.

2. The processing apparatus of claim 1 wherein the staged clients and the retry and suspend module employ distributed conflict resolution.

3. The processing apparatus of claim 2 wherein the staged clients and the retry and suspend module provide for multiple non-interfering transfers to occur concurrently.

4. The processing apparatus of claim 1 wherein the pipelined bus does not have a single point of contention.

5. The processing apparatus of claim 1 wherein all of the plurality of staged clients may transfer data concurrently.

6. The processing apparatus of claim 1 wherein the number of outstanding read transactions per client is limited only by the depth of queuing provided by the clients and the ability of the clients to resolve unique transactions.

7. The processing apparatus of claim 1 wherein data signals can be active every cycle during saturating transfer conditions.

8. The processing apparatus of claim 7 wherein road request signals issued by clients are decoupled from data transfers.

9. The processing apparatus of claim 8 wherein the read request signals issued by clients can be hidden during data transfers.

10. The processing apparatus of claim 1 wherein preemptive flow control is used for retying packets after collisions.

11. The processing apparatus of claim 1 wherein the clients form a chain.

12. The processing apparatus of claim 1 wherein the clients form a ring.

13. The processing apparatus of claim 1 wherein a sending client receives a signal indicating if a sent packet was received or rejected.

14. The processing apparatus of claim 1 wherein the retry and suspend module includes routing logic for both normal and reject acknowledgement from a receiving client to a sending client.

15. The processing apparatus of claim 14 wherein the retry and suspend module includes retry logic to provide retry initiation and suspension.

16. The processing apparatus of claim 15 wherein the retry logic ensures retry fairness and avoids client starvation.

17. The processing apparatus of claim 16 wherein the retry logic comprises logic to check for a combination of asserted bits in a retry array indicating blocked transfers among clients in a loop and logic to reset one of the bits in the blocked loop for the elimination of deadlocks.

18. A processing method comprising the steps of:
    connecting a plurality of clients using a pipelined bus, the pipelined bus allowing packet data transfers between clients;
    connecting a retry and suspend module to the clients;
    sending a data packet by a sending client;
    receiving a positive acknowledgement from a receiving client through the retry and suspend module if the data packet was received correctly by the receiving client;
    receiving a negative acknowledgement through the retry and suspend module when an intermediate client recognizes a conflict between packet data originating from the intermediate client and the packet data received by the intermediate client has a destination which would result in passing the packet data through the intermediate client;
    providing a retry signal to the sending client by the retry and suspend module; and
    resending a data packet by the sending client.

19. The processing apparatus of claim 1 wherein each staged client is a single instruction multiple data stream (SIMD) processor.

20. A pipelined bus system comprising:

a plurality of processors wherein one of the plurality of processors is a sending processor, a intermediate processor connected to an upstream processor and a downstream processor to form a transmission path for packet data, the intermediate processor operating to receive a first packet of data from the sending processor through the upstream processor and to transmit a second packet of data to the downstream processor, the intermediate processor operating to detect a conflict between the first and second packet of data when the destination of the first packet of data is downstream of the intermediate node; and a retry and suspend module connected to each processor, the retry and suspend module operating to receive and transmit control signals between any two of the plurality of processors, after detection of the conflict, the sending processor is suspended from transmitting packet data and a retry signal is asserted to the retry and suspend module, the retry and suspend module asserts the retry signal to the sending processor upon determining when it is time for the sending processor to retry sending the first packet of data.

21. A processing apparatus comprising:

a plurality of staged clients;

a pipelined bus connecting the staged clients, the pipelined bus allowing packet data transfers between the staged clients, each staged client connecting to an upstream client and a downstream client, a staged client sending first packet data to its downstream client and recognizing a conflict when the upstream client sends second packet data whose destination is downstream from the staged client; and a retry and suspend module connected to the plurality of staged clients, the retry and suspend module controlling the second packet data transfer retry of the upstream client utilizing control signals received from the staged client recognizing the conflict.

* * * * *